(12) United States Patent
Kuramoto et al.

(10) Patent No.: US 11,325,830 B2
(45) Date of Patent: May 10, 2022

(54) ALUMINUM NITRIDE PARTICLE

(71) Applicant: TOKUYAMA CORPORATION, Shunan (JP)

(72) Inventors: Akimasa Kuramoto, Shunan (JP); Yukihiro Kanechika, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 292 days.

(21) Appl. No.: 16/608,576

(22) PCT Filed: Apr. 27, 2018

(86) PCT No.: PCT/JP2018/017296
§ 371 (c)(1),
(2) Date: Oct. 25, 2019

(87) PCT Pub. No.: WO2018/199322
PCT Pub. Date: Nov. 1, 2018

(65) Prior Publication Data
US 2021/0114876 A1   Apr. 22, 2021

(30) Foreign Application Priority Data

Apr. 27, 2017 (JP) .............................. JP2017-088478
Mar. 6, 2018 (JP) .............................. JP2018-039928

(51) Int. Cl.
*C01B 21/072* (2006.01)
*C08K 3/28* (2006.01)

(52) U.S. Cl.
CPC ........ *C01B 21/0726* (2013.01); *C01B 21/072* (2013.01); *C08K 3/28* (2013.01);
(Continued)

(58) Field of Classification Search
CPC . C01P 2004/03; C01B 21/072; C01B 21/0726
See application file for complete search history.

(56) References Cited

U.S. PATENT DOCUMENTS

2012/0258310 A1   10/2012   Watanabe et al.
2013/0244036 A1    9/2013   Muneoka et al.
(Continued)

FOREIGN PATENT DOCUMENTS

EP    2 955 156 A1   12/2015
EP    3 409 643 A1   12/2018
(Continued)

OTHER PUBLICATIONS

Machine translation of JP 2016-155727 A, published Sep. 1, 2016.*
International Search Report (PCT/ISA/210) issued in PCT/JP2018/017296, dated Jul. 24, 2018.

*Primary Examiner* — Vickey Nerangis
(74) *Attorney, Agent, or Firm* — Birch, Stewart, Kolasch & Birch, LLP

(57) ABSTRACT

An aluminum nitride particle including: a plurality of planes randomly arranged in a surface of the particle, the plurality of planes forming an obtuse ridge part or an obtuse valley part in the surface of the particle, the plurality of planes being observable in a scanning electron micrograph with 500 times magnification; wherein the particle has a longer diameter L of 20 to 200 μm; a ratio L/D of the longer diameter L (unit: μm) to a shorter diameter D (unit: μm) of the particle is 1 to 1.25; and the plurality of planes comprise a first plane, wherein an area S (unit: μm²) of the first plane satisfies S/L≥1.0 μm.

12 Claims, 12 Drawing Sheets

(52) U.S. Cl.
CPC ...... *C01P 2004/03* (2013.01); *C01P 2004/54* (2013.01); *C01P 2004/61* (2013.01); *C01P 2006/80* (2013.01); *C08K 2003/282* (2013.01); *C08K 2201/005* (2013.01); *C08K 2201/016* (2013.01)

(56) References Cited

U.S. PATENT DOCUMENTS

| | | |
|---|---|---|
| 2015/0353355 A1 | 12/2015 | Fukunaga et al. |
| 2019/0031510 A1 | 1/2019 | Kuramoto et al. |

FOREIGN PATENT DOCUMENTS

| | | | |
|---|---|---|---|
| JP | 3-295863 A | | 12/1991 |
| JP | 2013-124202 A | | 6/2013 |
| JP | 2016155727 A | * | 9/2016 |
| TW | 201446642 A | | 12/2014 |
| WO | WO 2012/077551 A1 | | 6/2012 |
| WO | WO 2017/131239 A1 | | 8/2017 |

* cited by examiner

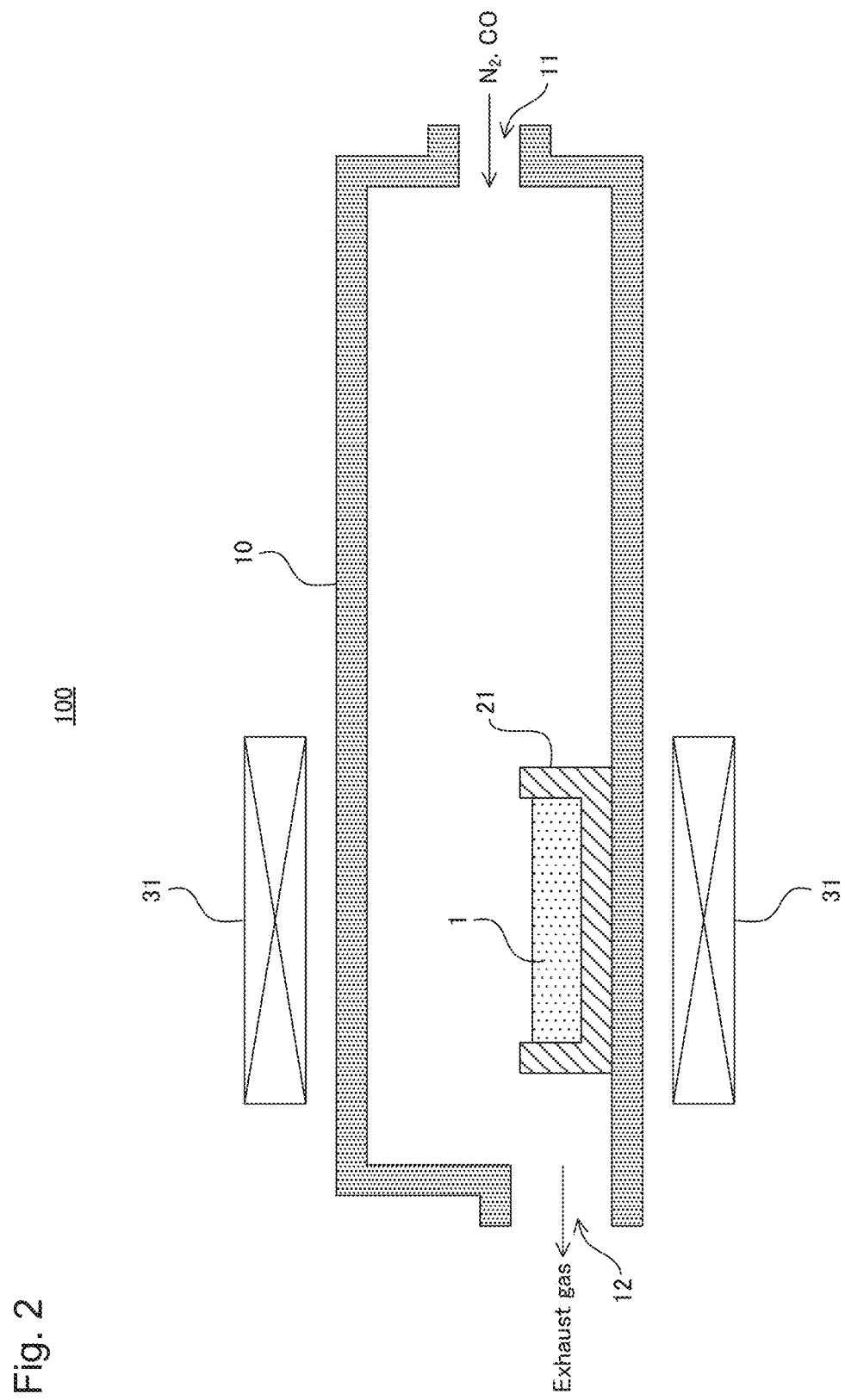

ALUMINUM NITRIDE PARTICLE

FIELD

The present invention relates to a novel aluminum nitride particle.

BACKGROUND

Aluminum nitride has a high thermal conductivity and good electrical insulation performance, and is used as an electrical insulation-thermal conductive filler filled in a heat radiator.

Formation of heat conduction paths by mutual contact of highly thermal conductive fillers in the heat radiator is important in improving thermal conductivity of the heat radiator. As a means to form good heat conduction paths, a combination of a large-sized filler gaining a distance of the heat conduction path and a small-sized filler as a sub-filler filling spaces between the large-sized fillers has been employed.

As a method for obtaining an aluminum nitride particle having a large particle size, for example, Patent Literature 1 discloses admixing a sintering aid, an organic binder, and a solvent to an aluminum nitride powder to have a mixture, drying and granulating the mixture by means of e.g., spray drying to have a globular granulated powder, and sintering the globular granulated powder. Aluminum nitride obtained by this method is generally referred to as "sintered granules". This method allows production of globular and large-sized aluminum nitride particles.

CITATION LIST

Patent Literature

Patent Literature 1: JP H3-295863 A
Patent Literature 2: WO 2012/077551 A1

SUMMARY

Technical Problem

Disadvantageously, contacts between the sintered granules of aluminum nitride are generally close to point contact. Thus there has been a room for improvement in thermal conductivity obtained when the sintered granules are employed as thermal conductive fillers.

For another example, as a production method of a large-sized aluminum nitride particle having a compact particle structure, Patent Literature 2 discloses sintering a mixture of an aluminum powder, a carbon powder, and a co-melting agent such as a rare earth metal compound in a mixed gas atmosphere of nitrogen and carbon monoxide such that reduction nitridation of the alumina powder proceeds, to grow aluminum nitride particles in a liquid phase formed by the co-melting agent (see Patent Literature 2).

This method allows production of compact and relatively large-sized aluminum nitride particles. Particle surfaces thereof observable by scanning electron micrograph (hereinafter "scanning electron microscope" may be referred to as "SEM") with 500 times magnification are, though, round-shaped and smooth, which means that contacts between particles are generally close to point contact. Thus there has been a room for improvement in thermal conductivity obtained when the aluminum nitride particles are used as thermal conductive fillers.

An object of the present invention is to provide an aluminum nitride particle which has a large particle size, and offers a high thermal conductivity when being used as a thermal conductive filler derived from a large contact area between the particles.

Solution to Problem

The present inventors have found, in reduction nitridation of a raw material mixture containing an alumina powder, a carbon powder, and a specific amount of a sulfur component, controlling a reaction atmosphere to have a specific gas composition at least at part of an earlier stage of the reduction nitridation reaction allows an aluminum nitride particle formed by the reduction nitridation to grow to a large size without forming a void inside the particle, and offers production of an aluminum nitride particle having a large-sized crystal surfaces randomly arranged in its particle surface.

A first aspect of the present invention is an aluminum nitride particle comprising: a plurality of planes randomly arranged in a surface of the particle, the plurality of planes forming an obtuse ridge part or an obtuse valley part in the surface of the particle, the plurality of planes being observable in a scanning electron micrograph with 500 times magnification, wherein the particle has a longer diameter L of 20 to 200 μm; a ratio L/D of the longer diameter L (unit: μm) to a shorter diameter D (unit: μm) of the particle is 1 to 1.25; and the plurality of planes comprise a first plane, wherein an area S (unit: μm$^2$) of the first plane satisfies S/L≥1.0 μm.

In the present description, conditions for SEM observation of aluminum nitride particles may be: acceleration voltage: 15 kV; and detection mode: secondary electron detection.

In the present description, the longer diameter L and the shorter diameter D of the aluminum nitride particle are obtained by image analysis of a SEM micrograph of the particle. That is, the longer diameter L and the shorter diameter D of the aluminum nitride particle are the longer diameter and the shorter diameter of an area in the SEM micrograph occupied by the particle.

In the present description, an area of a plane exiting in a surface of an aluminum nitride particle shall be an area in the SEM micrograph occupied by the plane. When the plane is oblique to an electron ray of SEM, the area the plane occupies in the SEM micrograph is smaller than the true area of the plane, but the area the plane occupies in the SEM micrograph shall be deemed to be the area of the plane even in such a case.

In the present description, the area S is an area which a single plane occupies in a SEM image. That is, even when two or more planes are observed in a particle surface such that an area S of each plane in the SEM image does not meet S/L≥1.0 m and the total area Sum the two or more planes occupy in the SEM image meets $S_{sum}$/L≥1.0 m, the particle is judged as not the aluminum nitride particle of the present invention as long as a plane such that an area S of the single plane in the SEM image meets S/L≥1.0 μm is not observed in the SEM image of the aluminum nitride particle.

In the present description, that the plurality of planes are "randomly" arranged in a surface of an aluminum nitride particle means that no regularity is found in arrangements and shapes of the plurality of planes except that the plurality of planes form a ridge part or a valley part and that the ridge/valley part has an obtuse angle. For example, the aluminum nitride particle disclosed in Patent Literature 2 has a hexagonal cylinder-shaped trunk part, and thus each pair of two adjacent planes of the six planes forms an obtuse (about 120°) ridge part, but their arrangement has a regularity and thus is not random.

A second aspect of the present invention is an aluminum nitride powder comprising: the aluminum nitride particle of the first aspect of the present invention, in an amount of no less than 40 volume %. Here, the content of the aluminum nitride particle of the first aspect of the present invention in the aluminum nitride powder (unit: volume %; hereinafter may be referred to as "content $R_v$") means the ratio of the total volume of the aluminum nitride particles of the first aspect of the present invention on the basis of the total volume of all the particles of the aluminum nitride powder. The content $R_v$ (unit: volume %) is calculated by the following formula (1) based on a SEM image (secondary electron detection) of the aluminum nitride powder:

$$R_V = 100 \times \frac{\sum_i (S_{A,i})^{\frac{3}{2}}}{\sum_i (S_{A,i})^{\frac{3}{2}} + \sum_j (S_{B,j})^{\frac{3}{2}}} \quad (1)$$

in the formula (1), $S_{A,i}$ (i=1, . . . , $N_A$) represents an area (unit: μm²) each aluminum nitride particle of the first aspect of the present invention observed in a SEM image of the aluminum nitride powder occupies in the SEM image; $S_{B,j}$ (j=1, . . . , $N_B$) represents an area (unit: μm²) each aluminum nitride particle outside the scope of the first aspect of the present invention observed in the SEM image of the aluminum nitride powder occupies in the SEM image; $\Sigma_i$ represents the sum for any i (i=1, . . . $N_A$); $\Sigma_j$ represents the sum for any j (j=1, . . . , $N_B$); $N_A$ represents the number of aluminum nitride particles judged to be inside the scope of the first aspect of the present invention in SEM observation of the aluminum nitride powder; and $N_B$ represents the number of aluminum nitride particles judged to be outside the scope of the first aspect of the present invention in SEM observation of the aluminum nitride powder.

It is noted that randomly selected particles shall be judged to be inside or outside the scope of the aluminum nitride particle of the first aspect of the present invention. In calculating the content $R_v$ by the above formula, preferably $N_A+N_B \geq 100$, and more preferably $N_A+N_B \geq 1000$. That is, calculation of the content $R_v$ by the above formula is preferably based on SEM observation results of no less than 100 particles randomly selected, and more preferably based on SEM observation results of no less than 1000 particles randomly selected.

A third aspect of the present invention is a filler for a resin, the filler consisting of the aluminum nitride powder of the second aspect of the present invention.

A fourth aspect of the present invention is a resin composition comprising: the filler for the resin of the third aspect of the present invention; and a resin, wherein a content $W_{particle}$ of the aluminum nitride particle of the first aspect of the present invention in the resin composition is 300 to 1000 parts by weight per 100 parts by weight of the resin; and the content $W_{particle}$ (unit: parts by weight) of the aluminum nitride particle is calculated by the following formula (2):

$$W_{particle} = W_{powder} \times \frac{R_V}{100} \quad (2)$$

wherein $W_{powder}$ (unit: parts by weight) is a content of the aluminum nitride powder of the second aspect of the present invention in the resin composition; and $R_v$ (unit: volume %) is a content of the aluminum nitride particle of the first aspect of the present invention in the aluminum nitride powder.

A fifth aspect of the present invention is a method for producing an aluminum nitride powder, the method comprising: (i) carrying out reduction nitridation of an alumina powder, the (i) comprising heating a raw material mixture in a nitrogen gas-containing atmosphere, the raw material mixture comprising the alumina powder, a carbon powder, and a sulfur component; and (ii) after completion of the reduction nitridation, keeping, for no less than 1 hour, a product of the reduction nitridation at a temperature within ±30° C. of a heating temperature at a time the reduction nitridation is completed in an atmosphere such that an aluminum nitride powder formed in the (i) is not oxidized.

In one embodiment, the (i) comprises: (i-a) carrying out the reduction nitridation in the nitrogen gas-containing atmosphere being a mixed gas of 55 to 30 volume % of nitrogen gas and 45 to 70 volume % of a diluting gas, at least while a nitridation ratio is 3 to 50%.

In one embodiment, the (i) comprises: (i-b1) placing the raw material mixture in a setter and placing the setter in a reactor, the setter comprising: a boat-shaped vessel, a top of the vessel being open; a lid closing the top of the vessel; a first opening arranged on an upstream side in a gas flow direction in the reactor such that a gas can be introduced into the setter; and a second opening arranged on a downstream side in the gas flow direction in the reactor such that a gas can flow out of the setter; (i-b2) supplying nitrogen gas or a mixed gas comprising nitrogen gas and a diluting gas into the reactor; (i-b3) making part of a gas supplied into the reactor flow into the setter through the first opening; (i-b4) forming the nitrogen gas-containing atmosphere in the setter, from a gas flowing into the setter from the first opening and carbon monoxide gas generated by the reduction nitridation; and (i-b5) carrying out the reduction nitridation in the nitrogen gas-containing atmosphere in the setter, while maintaining conditions such that an average nitrogen gas content $p^{avr}_{N2}$ in the nitrogen gas-containing atmosphere in the setter calculated by the following formula (3) becomes 55 to 30 volume % and such that an average diluting gas content $p^{avr}_{dilute}$ in the nitrogen gas-containing atmosphere in the setter calculated by the following formula (4) becomes 45 to 70 volume %, at least while a nitridation ratio is 5 to 50%:

$$p^{avr}_{N_2} = \frac{1}{2}\left(p^{in}_{N_2} + 100 \times \frac{\frac{p^{in}_{N_2}}{100} \cdot \frac{S_{open}}{S_{open}+S_{bypass}} V^{in} - \frac{1}{3}V^f_{CO}}{\frac{S_{open}}{S_{open}+S_{bypass}} V^{in} + \frac{2}{3}V^f_{CO}}\right) \quad (3)$$

$$p^{avr}_{dilute} = \frac{1}{2}\left(p^{in}_{dilute} + 100 \times \frac{\frac{p^{in}_{dilute}}{100} \cdot \frac{S_{open}}{S_{open}+S_{bypass}} V^{in} + V^f_{CO}}{\frac{S_{open}}{S_{open}+S_{bypass}} V^{in} + \frac{2}{3}V^f_{CO}}\right) \quad (4)$$

wherein $p^{in}_{N2}$ (unit: volume %) is a nitrogen gas content of the gas flowing into the setter; $p^{in}_{dilute}$ (unit: volume %) is a diluting gas content of the gas flowing into the setter; $V^{in}$ (unit: m³/s) is a gas inflow into the reactor; $S_{open}$ (unit: m²) is a minimum value of a cross section of a gas flow path formed by the first opening of the setter; $S_{bypass}$ (unit: m²) is a minimum value of a cross section of a gas flow path bypassing the setter; and $V^f_{CO}$ (unit: m³/s) is a rate of generation of carbon monoxide gas in the setter.

In the present description, the "nitridation ratio" in the reduction nitridation reaction of alumina means the ratio of Al atoms converted to AlN (aluminum nitride) out of Al atoms derived from the raw material alumina.

In the fifth aspect of the present invention, the content of the sulfur component in the raw material mixture is preferably 1.0 to 20 parts by weight in terms of sulfur per 100 parts by weight of the alumina powder in the raw material mixture.

Advantageous Effects of Invention

In the particle surface of the aluminum nitride particle of the first aspect of the present invention, a large-area plane meeting S/L≥1.0 µm exists, and arrangement and shapes of the plurality of planes are random. This offers increased chances of plane contact between particles when the aluminum nitride particles are filled in a resin, even when the particle size is 20 µm or more. The aluminum nitride particle of the first aspect of the present invention thus offers a higher thermal conductivity when it is used as a thermal conductive filler, than conventional globular aluminum nitride particles.

Further, the aluminum nitride particle of the first aspect of the present invention has a ratio L/D being close to 1 wherein the ratio L/D is a ratio of the longer diameter L to the shorter diameter D, which offers good fluidity of the particles and thus allows closer filling of the particles in a resin.

The aluminum nitride powder of the second aspect of the present invention may be preferably used as a filler for a resin (third aspect of the present invention).

The resin composition of the fourth aspect of the present invention comprises the aluminum nitride particle of the first aspect of the present invention, and thus offers a further higher thermal conductivity as a filler, than a resin composition comprising conventional aluminum nitride particles.

The aluminum nitride powder of the second aspect of the present invention may be produced by the method for producing the aluminum nitride powder of the fifth aspect of the present invention.

BRIEF DESCRIPTION OF DRAWINGS

FIG. 2 is a cross-sectional view schematically illustrating a reaction apparatus 100 that may be used for a method for producing an aluminum nitride powder of one embodiment of the present invention.

DETAILED DESCRIPTION OF EMBODIMENTS

Figure 1B:
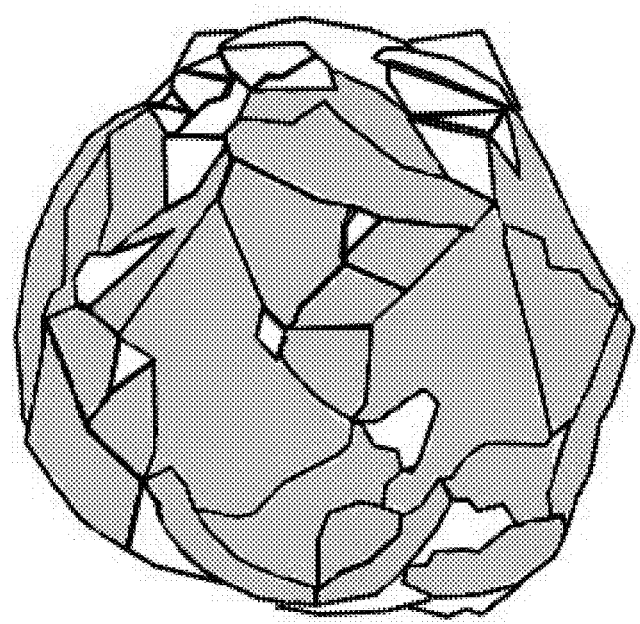
FIG. 1B shows one particle in FIG. 1A indicating planes forming ridge or valley parts by enclosing them with lines.

Hereinafter the embodiments of the present invention will be described in more detail with reference to the drawings. The present invention is not limited to these embodiments. The measures in the drawings do not always represent exact measures. Some reference signs may be omitted in the drawings. In the present description, expression "A to B" concerning numeral values A and B means "no less than A and no more than B" unless otherwise specified. In such expression, if a unit is added only to the numeral value B, this unit is applied to the numeral value A as well. A word "or" means a logical sum unless otherwise specified.

<1. Aluminum Nitride Particle>

Figure 1A:
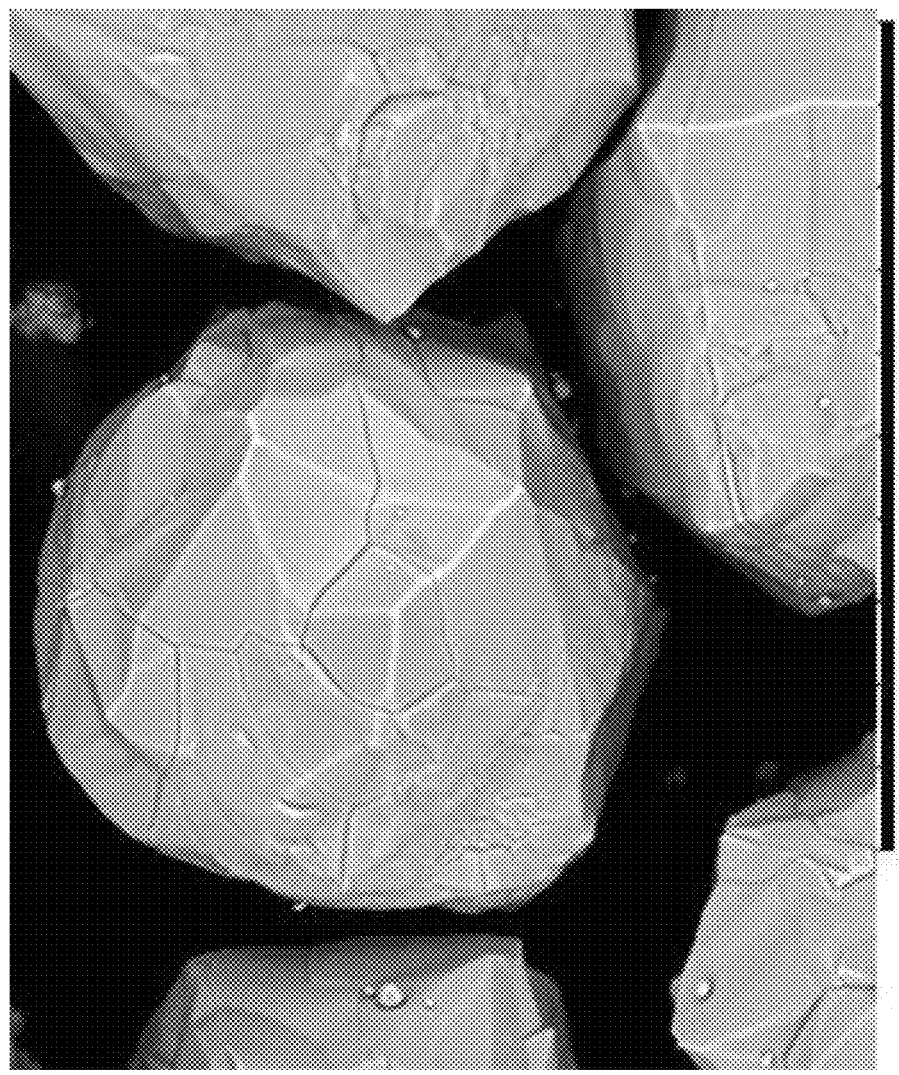
FIG. 1A is a SEM micrograph of aluminum nitride particles of one embodiment of the present invention obtained in Example 1 with 500 times magnification.

Characteristics of the aluminum nitride particle of the first aspect of the present invention (hereinafter may be referred to as "the aluminum nitride particle of the present invention") can be confirmed by observation by means of a SEM micrograph with 500 times magnification. FIG. 1A is a SEM micrograph of aluminum nitride particles of one embodiment of the present invention obtained in Example 1 with 500 times magnification (acceleration voltage: 15 kV, detection mode: secondary electron detection). As is confirmed in FIG. 1A, the aluminum nitride particle of the present invention comprises: a plurality of planes randomly arranged in a surface of the particle, the plurality of planes forming an obtuse ridge part or an obtuse valley part in the surface of the particle, the plurality of planes being observable in a scanning electron micrograph with 500 times magnification, wherein the particle has a longer diameter L of 20 to 200 µm; the ratio L/D of the longer diameter L (unit: µm) to a shorter diameter D (unit: µm) of the particle is 1 to 1.25; and the plurality of planes comprise a first plane, wherein an area S (unit: µm²) of the first plane satisfies S/L≥1.0 µm.

The planes existing in the surface of the aluminum nitride particles are considered to be derived from crystal faces of aluminum nitride. FIG. 1B shows one particle in FIG. 1A indicating planes forming ridge or valley parts by encircling them with lines. As can be seen, in the surface of the aluminum nitride particle of the present invention, a part surrounded by ridge or valley parts stretches continuously to form a plane. Such a plane shall be deemed to be a single plane even if it includes (a) groove-shaped recess(es), as long as it is not interrupted by an additional ridge or valley part.

The plurality of planes are randomly arranged in the particle surface, forming (a) ridge part(s) or (a) valley part(s). That is, regularity is not found in arrangement and shapes of the plurality of planes, except that the plurality of planes form (a) ridge part(s) or (a) valley part(s), and the ridge part(s) and the valley part(s) have (an) obtuse angle(s). Such random arrangement of the plurality of planes in the particle surface offers improved fluidity of particles, which allows closer filling of particles in a resin. Although almost the entire surface of the aluminum nitride particle is preferably constituted of the plurality of planes, there may partly exist (a) not planar part(s) in the particle surface. In SEM observation of a particle, the ratio of an area in a SEM image occupied by any part(s) other than the plurality of planes of the particle to an area in the SEM image occupied by the particle is preferably no more than 20%, and especially preferably no more than 5%.

As described above, in a SEM image of the aluminum nitride particle of the present invention observed with 500 times magnification, each of at least one plane (single plane) observed in the surface of the particle satisfies $S/L \geq 1.0$ μm wherein S is an area in the SEM image of the particle occupied by the single plane, and L is the longer diameter of the particle. The plane which satisfies $S/L \geq 1.0$ m wherein S is an area in a SEM image of the particle occupied by the single plane, and L is the longer diameter of the particle may be hereinafter referred to as "first plane". It is preferable that two or more of the first planes be observed in the surface of a particle. Further, it is preferable that a plurality of the first planes be observed in the surface of the aluminum nitride particle and the plurality of the first plane occupies no less than 50%, more preferably no less than 65% in total of an area the particle occupies in the SEM image. Such an aluminum nitride particle comprises (a) large-area plane(s), which conventional aluminum nitride sintered granules do not comprise, arranged randomly in the particle surface of the aluminum nitride particle, which offers increased chances of plane contact between particles, which thus offers a further improved thermal conductivity when the particles are filled in a resin. In one embodiment, the ratio may be no less than 80%. An average (arithmetic mean) of the ratio of the total area of the first plane(s) to the area the particle occupies in a SEM image is preferably no less than 60%, and more preferably no less than 65%. The average value is preferably a value averaged over no less than 100 particles, and more preferably no less than 1000 particles.

From the same point of view, it is preferable that, for at least one of the plurality of planes, each plane (single plane) preferably has an area S (unit: μm) satisfying $S/L^2 \geq 0.05$. Such a plane that satisfies $S/L^2 \geq 0.05$ wherein S is an area a single plane occupies in a SEM image of the particle and L is the longer diameter of the particle may be hereinafter referred to as a "second plane". Preferably, two or more of the second planes are observed in a surface of a particle. It is noted that a single same plane may be the second plane and the first plane at the same time. Further, it is preferable that a plurality of the second planes be observed in a surface of an aluminum nitride particle and the ratio of the total area of the plurality of the second planes in the SEM image to an area the particle occupies in the SEM image is no less than 50%, which is especially preferably no less than 65%. An average (arithmetic mean) of the ratio of the total area of the second plane(s) in a SEM image of a particle to an area the particle occupies in the SEM image is preferably no less than 60%, and more preferably no less than 65%. The average value is preferably a value averaged over no less than 100 particles, and more preferably no less than 1000 particles.

As described above, (an) area(s) of planes in a surface of an aluminum nitride particle and ratios and proportions concerning the area(s) are calculated by image analysis of a SEM image of the particle.

Conventional aluminum nitride sintered granules have structures in which aluminum nitride particles are sintered with each other, and thus, there are many minute protrusions and recesses in the surface of the sintered granule derived from grooves formed between aluminum nitride particles, which may lead to viscosity increase of a mixture when the sintered granules and a resin are mixed. Further, air bubbles easily remain in the interface between the sintered granule and the resin in a resin composition comprising the sintered granules. In the resin composition, the air bubbles remaining on surfaces of the sintered granules lower dielectric strength of the resin composition. In contrast, on the aluminum nitride particle of the present invention, the above described plane forms a ridge or valley part with its adjacent plane, and thus there is little gap between adjacent planes, which means a fine particle surface. This reduces air bubbles which get caught when filling the particles in a resin, which offers improved dielectric strength of a resin composition comprising the particles.

In one preferred embodiment, the aluminum nitride particle of the present invention has a compact inner structure. In the concrete, preferably the particle does not comprise a void having a diameter of no less than 5 μm. In the present description, that an aluminum nitride particle does not comprise a void having a diameter of no less than 5 m means that a cross section of a void having an area equal to or greater than an area of a circle of 5 μm in diameter is not observed in a cross-sectional SEM image of the aluminum nitride particle, that is, that a diameter of a circle having an area equal to a cross section of any void observed in a cross-sectional SEM image of the aluminum nitride particle (equivalent circle diameter) is less than 5 μm. Conventional aluminum nitride sintered granules may comprise a large void inside the sintered granule, derived from a difference of drying speed of a globular granulated powder between inner part and outer part thereof. The voids existing in the sintered granules lower dielectric strength of a resin composition comprising the sintered granules. In contrast, a compact aluminum nitride particle of such a preferred embodiment of the present invention offers improved dielectric strength of the aluminum nitride particle itself, and thus offers further improved dielectric strength of a resin composition comprising the particle.

Figure 12:
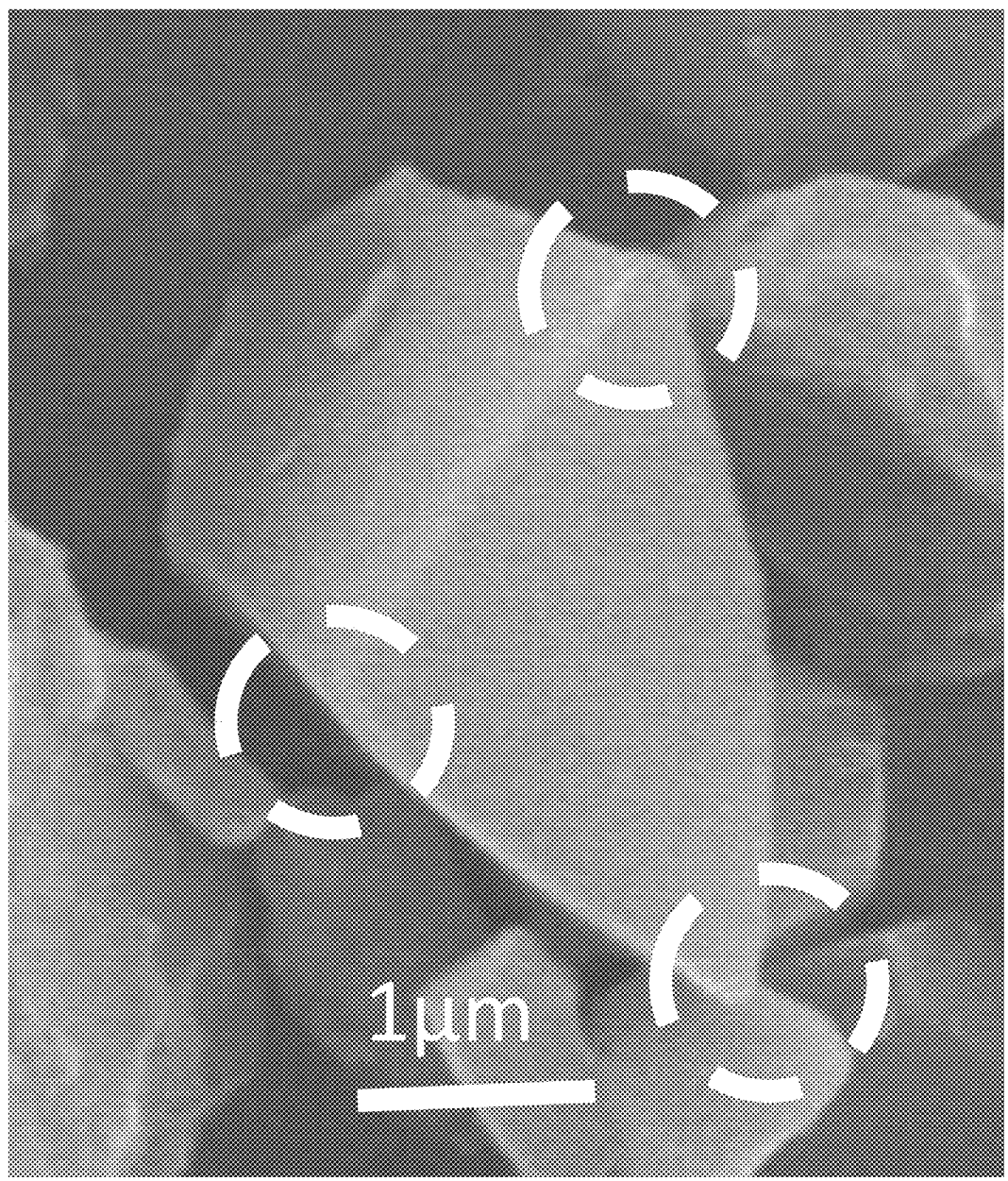
FIG. 12 is a SEM micrograph of conventional crushed aluminum nitride particles (acceleration voltage: 25 kV, secondary electron detection, 7000 times magnification).

FIG. 12 shows a SEM micrograph (acceleration voltage: 25 kV, secondary electron detection, 7000 times magnification) of conventional crushed aluminum nitride particles obtained by crushing an aluminum nitride bulk. As can be seen in the SEM micrograph of FIG. 12, a conventional crushed aluminum nitride particle has acute ridge parts (see positions encircled by a circle of a broken line on FIG. 12). In contrast, as can be seen from the SEM micrograph of FIG. 1A, in the surface of the aluminum nitride particle of the present invention, adjacent planes form an obtuse ridge part or an obtuse valley part, which offers good fluidity of particles. The aluminum nitride particles of the present invention thus can be filled in a rein more closely.

The content of rare earth metal impurities in the aluminum nitride particle of the present invention (the content of the total impurities if impurities of a plurality of rare earth metals are contained) is preferably no more than 1 mass ppm in terms of metal. That is, it is preferable that the aluminum nitride particle substantially do not comprise rare earth metal impurities derived from a high-melting-point co-melting agent, which has been conventionally used so as to produce large-sized particles. Examples of rare earth metals comprised in conventional co-melting agents include yttrium, lanthanum, cerium, praseodymium, and terbium. Conventional co-melting agents comprise compounds of these rare earth metals (such as oxide, carbide, and halide (such as fluoride)). The content of rare earth metal impurities being no more than 1 mass ppm in terms of metal offers a further improved thermal conductivity of the particle itself.

The aluminum nitride particle of the present invention has the ratio L/D of the longer diameter L to the shorter diameter D of 1 to 1.25, which is close to 1, which offers good fluidity of particles, which thus offers closer filling of particles in a resin. L/D is by definition no less than 1, and preferably no more than 1.2.

<2. Aluminum Nitride Powder>

The aluminum nitride powder of the second aspect of the present invention (hereinafter may be referred to as "the aluminum nitride powder of the present invention") comprises the aluminum nitride particle of the first aspect of the present invention, in an amount of no less than 40 volume %.

In the present description, the content of the aluminum nitride particle of the present invention in the aluminum nitride powder $R_v$ (unit: volume %) means the ratio of the total volume of the aluminum nitride particles of the present invention on the basis of the total volume of all the particles of the aluminum nitride powder. The content $R_v$ (unit: volume %) is calculated by the following formula (1) based on a SEM image (secondary electron detection) of the aluminum nitride powder:

$$R_V = 100 \times \frac{\sum_i (S_{A,i})^{\frac{3}{2}}}{\sum_i (S_{A,i})^{\frac{3}{2}} + \sum_j (S_{B,j})^{\frac{3}{2}}} \quad (1)$$

in the formula, $S_{A,i}$ (i=1, . . . , $N_A$) represents an area (unit: μm²) each aluminum nitride particle of the present invention observed in a SEM image of the aluminum nitride powder occupies in the SEM image; $S_{B,j}$ (j=1, . . . , $N_B$) represents an area (unit: μm²) each aluminum nitride particle outside the scope of the present invention observed in the SEM image of the aluminum nitride powder occupies in the SEM image; $\Sigma_i$ represents the sum for any i (i=1, . . . m $N_A$); $\Sigma_i$ represents the sum for any j (j=1, . . . , $N_B$); $N_A$ represents the number of aluminum nitride particles judged to be inside the scope of the aluminum nitride particle of the present invention in SEM observation of the aluminum nitride powder; and $N_B$ represents the number of aluminum nitride particles judged to be outside the scope of the aluminum nitride particle of the present invention in SEM observation of the aluminum nitride powder.

It is noted that randomly selected particles shall be judged to be inside or outside the scope of the aluminum nitride particle of the first aspect of the present invention. In calculating the content $R_v$ by the above formula, preferably $N_A+N_B \geq 1000$. That is, calculation of the content $R_v$ by the above formula is preferably based on SEM observation results of no less than 1000 particles randomly selected.

The content $R_v$ of the aluminum nitride particle of the present invention in the aluminum nitride powder is no less than 40 volume %, preferably no less than 50 volume %, and especially preferably no less than 55 volume %, although $R_v$ may vary to some extent depending on conditions of the reduction nitridation reaction explained later. The upper limit thereof is not specifically restricted, may be 100 volume %, is no more than 90 volume % in one embodiment, and is no more than 80 volume % in another embodiment. Even if the aluminum nitride powder of the present invention is used as it is without separating the aluminum nitride particles of the present invention from other aluminum nitride particles, the aluminum nitride powder of the present invention can sufficiently exhibit the effects explained above in relation to the aluminum nitride particle of the present invention.

In the aluminum nitride powder of the present invention, the content of rare earth metal impurities (the content of the total impurities if impurities of a plurality of rare earth metals are contained) is preferably no more than 1 mass ppm in terms of metal on the basis of the total mass of the aluminum nitride powder (100 mass %). The content of rare earth metal impurities in the aluminum nitride powder being no more than 1 mass ppm offers a further improved thermal conductivity of the aluminum nitride particle itself. The content of rare earth metal impurities in the aluminum nitride powder can be measured by inductively coupled plasma atomic emission spectroscopy.

The aluminum nitride powder of the present invention can be obtained by a production method described later.

<3. Use of Aluminum Nitride Particle/Powder>

Use of the aluminum nitride particle and the aluminum nitride powder of the present invention is not specifically restricted. Examples of preferred uses thereof include incorporating the aluminum nitride particles or the aluminum nitride powder into a resin as a filler (filler for a resin) for the purpose of e.g., improving electric insulation and improving thermal conductivity. For example, the filler for a resin of the third aspect of the present invention (hereinafter may be referred to as "the filler for a resin of the present invention") consists of the aluminum nitride powder of the present invention. A resin composition comprising the aluminum nitride particles or the aluminum nitride powder of the present invention as a filler (filler for a resin) has an improved thermal conductivity, derived from increased chances of plane contact between aluminum nitride particles. Electric insulation of such a resin composition can be easily improved, derived from decreased chances for air bubbles to remain on surfaces of aluminum nitride particles in the resin composition.

The aluminum nitride particle and the aluminum nitride powder of the present invention thus can be preferably used as a filler for solid or liquid thermal interface materials such as heat transfer sheets or heat transfer gels for electric components.

<4. Resin Composition>

The resin composition of the fourth aspect of the present invention (hereinafter may be referred to as "the resin composition of the present invention") is a resin composition comprising: the filler for the resin of the present invention; and a resin.

The resin composition of the present invention can be obtained by, for example, uniformly mixing the resin and the aluminum nitride powder by means of a known mixer according to the resin, to disperse the particles of the aluminum nitride powder in the resin. Examples of the mixer include conventional kneading machines such as rolls, a kneader, a Banbury mixer, and a planetary centrifugal mixer.

Examples of the resin include thermoplastic resins such as polyolefin, polyvinyl chloride, methyl methacrylate resin, nylon, and fluororesin; thermosetting resins such as epoxy resin, phenol resin, urea resin, melamine resin, unsaturated polyester resin, and silicon resin; and synthetic rubbers.

The content of the aluminum nitride particles of the present invention in the resin composition may be determined considering e.g., dispersibility of the aluminum nitride powder, and thermal conductivity and moldability required for obtained moldings. The content $W_{particle}$ of the aluminum nitride particle of the present invention in the resin composition is 300 to 1000 parts by weight, and more preferably 500 to 1000 parts by weight, per 100 parts by weight of the resin; and the content $W_{particle}$ (unit: parts by weight) is calculated by the following formula (2):

$$W_{particle} = W_{powder} \times \frac{R_V}{100} \quad (2)$$

wherein $W_{powder}$ (unit: parts by weight) is a content of the aluminum nitride powder of the present invention in the resin composition; and $R_v$ (unit: volume %) is a content of the aluminum nitride particle of the present invention in the aluminum nitride powder. The definition of the content $R_v$ is as described about the aluminum nitride powder of the second aspect of the present invention (formula (1)).

The resin composition of the present invention may consist of a resin and the aluminum nitride powder of the present invention, or may further comprise (a) component(s) other than the aluminum nitride powder and the resin to the extent such that effects of the present invention are not significantly spoiled. Examples of (a) component(s) which may be comprised in the resin composition of the present invention include fillers such as an aluminum nitride powder other than the aluminum nitride powder of the present invention, an alumina powder, a boron nitride powder, a zinc oxide powder, a silicon nitride powder, a silicon carbide powder, and a graphite powder. One of such other fillers may be used alone, or two or more of them may be used in combination. The average particle size of the aluminum nitride powder of the present invention, and particle shape (such as granular, needles, fibers, scales, and indeterminate) and average particle size of other fillers may be selected depending on e.g., use.

<5. Method for Producing Aluminum Nitride Powder>

The method for producing the aluminum nitride powder of the second aspect of the present invention is not specifically restricted. For example, the aluminum nitride powder of the second aspect of the present invention may be preferably produced by the method for producing the aluminum nitride powder of the fifth aspect of the present invention (hereinafter may be referred to as "the production method of the present invention").

The production method of the present invention comprises: (i) carrying out reduction nitridation of an alumina powder, the (i) comprising heating a raw material mixture in a nitrogen gas-containing atmosphere, the raw material mixture comprising the alumina powder, a carbon powder, and a sulfur component; and (ii) after completion of the reduction nitridation, keeping, for no less than 1 hour, a product of the reduction nitridation at a temperature within ±30° C. of a heating temperature at a time the reduction nitridation is completed in an atmosphere such that an aluminum nitride powder formed in the (i) is not oxidized, the (i) comprising: (i-a) carrying out the reduction nitridation in the nitrogen gas-containing atmosphere being a mixed gas of 55 to 30 volume % of nitrogen gas and 45 to 70 volume % of a diluting gas, at least while a nitridation ratio is 5 to 50%.

Reduction nitridation of an alumina powder gives aluminum nitride. For example, any known alumina powder of α-alumina, γ-alumina, etc. may be used as the alumina powder. Among them, α-alumina is especially preferably used. The purity of the alumina powder is preferably no less than 99.0 mass %, and more preferably no less than 99.5 mass %. The average particle size of the alumina powder is preferably 0.5 to 50 μm, and more preferably 1 to 30 μm. In the present description, the average particle size of the alumina powder is sphere equivalent diameter D50 (median diameter) which gives a median value in a volume distribution measured by laser diffraction/scattering method (hereinafter may be referred to as "average particle size D50"). For example, Microtrac MT300011 (manufactured by MicrotracBEL Corp.) may be used for measurement of the average particle size D50 by laser diffraction/scattering method.

The carbon powder works as a reducing agent. Examples of the carbon powder include known carbon powders such as furnace black, channel black, thermal black, and acetylene black. The average particle size of the carbon powder is preferably no more than 100 nm, and more preferably no more than 50 nm. In the present description, the average particle size of the carbon powder is the average particle size D50 by laser diffraction/scattering method. The DBP oil absorption of the carbon powder is preferably 50 to 150 $cm^3/100$ g, and more preferably 70 to 130 $cm^3/100$ g. The DBP oil absorption of the carbon powder may be measured conforming to JIS K6217-4.

In addition to the carbon powder, synthetic resin polymer such as phenol resin, melamine resin, and epoxy resin; any hydrocarbon compound such as pitch and tar; any organic compound such as cellulose, sucrose, starch, polyvinylidene chloride, and polyphenylene; etc. may be used as a carbon source, to the extent such that effects of the present invention are not spoiled.

The sulfur component works in an operation of adjusting an atmosphere for the reduction nitridation reaction (explained later). The compound of the sulfur component is not particularly limited as long as it can co-melt with the raw material alumina powder. Examples of the sulfur component include elemental sulfur, and sulfur compounds such as aluminum sulfide, nitrogen sulfide, and thiouric acid. One sulfur component may be used alone, or two or more sulfur components may be used in combination. If the carbon powder comprises sulfur, the sulfur content of the carbon powder also works as part of the sulfur component in the production method of the present invention.

If the amount of the carbon powder in the raw material mixture is too large, the carbon powder inhibits contact between alumina particles and thus hinders grain growth, which results in smaller particle size of the obtained aluminum nitride particle. The amount of the carbon powder in the raw material mixture is thus preferably 36 to 200 parts by weight, and more preferably 40 to 100 parts by weight, per 100 parts by weight of the alumina powder.

The amount of the sulfur component in the raw material mixture is preferably 0.8 to 20 parts by weight, more preferably 1.0 to 20 parts by weight, further preferably 2.5 to 20 parts by weight, further more preferably 2.5 to 10 parts by weight, and especially preferably 5 to 10 parts by weight, in terms of sulfur per 100 parts by weight of the alumina powder. The amount of the sulfur component can be made within the above range by adjusting sulfur content in the carbon powder, and the amount of the sulfur powder and/or the sulfur compound incorporated in the raw material mixture. When adjusting the amount of the sulfur component by the amount of sulfur content in the carbon powder, the amount of the carbon powder may be adjusted such that the amount of the sulfur component becomes within the above range, or a first carbon powder having a high sulfur content and a second carbon powder having a low sulfur content may be used in combination and their mixing rate may be adjusted such that the amount of the sulfur component becomes within the above range.

Preferably, the raw material mixture substantially does not comprise a conventional co-melting agent containing a rare earth metal compound explained above. Specifically, the total content of any rare earth metal element in the raw material mixture is preferably no more than 10 weight ppm (that is, $1.0 \times 10^{-3}$ parts by weight), and more preferably 1 weight ppm (that is, $1.0 \times 10^{-4}$ parts by weight), in terms of metal per 100 parts by weight of Al atoms derived from the alumina powder in the raw material mixture. So as to produce large-sized aluminum nitride particles by a conventional method employing a co-melting agent, it has been necessary to use a co-melting agent having a high melting point which can remain in the system until the reduction nitridation reaction completes. If the co-melting agent remains in the obtained aluminum nitride particles, it lowers thermal conductivity of the particles. The production method of the present invention makes it possible to produce an aluminum nitride powder comprising large-sized aluminum nitride particles, even without employing a high melting-point co-melting agent which has been used in conventional methods. The production method of the present invention thus offers production of an aluminum nitride powder with a further improved thermal conductivity of the aluminum nitride particle itself.

A method for mixing raw materials so as to obtain the raw material mixture is not specifically restricted as long as the raw materials can be uniformly mixed by the method. Examples of a mixer for mixing the raw materials include conventional mixers such as a vibrating mill, a bead mill, a ball mill, a Henschel mixer, a drum mixer, a vibrating stirrer, and a V-blender.

The step (i) is a step of carrying out the reduction nitridation of the alumina powder, the step (i) comprising heating the raw material mixture in a nitrogen gas-containing atmosphere, the raw material mixture comprising the alumina powder, the carbon powder, and the sulfur component. Preferably, the step (i) is conducted under a flow of a nitrogen gas-containing gas in a reactor. The temperature at which the raw material mixture is heated in the step (i) is not particularly limited as long as the reduction nitridation reaction proceeds, and may be preferably 1500 to 2000° C. The nitrogen gas-containing atmosphere in which the raw material mixture exists in the step (i) comprises a diluting gas, and generally the proportion thereof can be confirmed by measuring a gas composition of a raw material gas supplied to the reactor and a gas composition of an exhaust gas flowing out of the reactor.

The step (i) can be carried out using a reaction apparatus which can control a reaction atmosphere. Examples of such a reaction apparatus include atmosphere controlled high temperature furnace which is capable of heating treatment by means of e.g., high-frequency induction heating or resistance heating. The reaction apparatus may be a batch furnace, or a continuous nitriding furnace such as a pusher tunnel furnace and a vertical furnace.

The step (ii) is a step of, after completion of the reduction nitridation in the step (i), keeping, for no less than 1 hour, a product of the reduction nitridation at a temperature within ±30° C. of a heating temperature at a time the reduction nitridation is completed in an atmosphere such that an aluminum nitride powder formed in the step (i) is not oxidized. As described above, the heating temperature at the time the reduction nitridation is completed is preferably 1500 to 2000° C. The step (ii) is preferably carried out immediately after the step (i). That is, it is preferable that after completion of the step (i), any gas which oxidizes an aluminum nitride powder be not introduced into the reactor until the step (ii) is begun; and it is preferable that after completion of the step (i) and until the step (ii) is begun, the temperature of the product be not changed beyond ±30° C. from the heating temperature at the time the reduction nitridation is completed. As described above, the retention time in the step (ii) is no less than 1 hour, preferably no less than 2 hours, and further preferably no less than 5 hours. The upper limit of the retention time in the step (ii) is not specifically limited, and for example, may be no more than 10 hours.

In one embodiment, the step (i) comprises: (i-a) carrying out the reduction nitridation in the nitrogen gas-containing atmosphere being a mixed gas of 55 to 30 volume % of nitrogen gas and 45 to 70 volume % of a diluting gas, at least while a nitridation ratio is 5 to 50%.

In the present description, the "nitridation ratio" in the reduction nitridation reaction of alumina means the ratio of Al atoms converted to AlN (aluminum nitride) out of Al atoms derived from the raw material alumina. The definition of the nitridation ratio $R_N$ (%) is represented by the following formula (5):

$$R_N = 100 \times \frac{n^f_{AlN}}{n^{total}_{Al}} \qquad (5)$$

wherein $n^{total}_{Al}$ (mol) is the total amount of Al atoms derived from the alumina powder in the raw material mixture; and $n^f_{AlN}$ (mol) is the amount of aluminum nitride formation.

The reaction equation of the reduction nitridation reaction in the step (i) is represented by the following formula (6):

$$Al_2O_3 + 3C + N_2 \rightarrow 2AlN + 3CO\uparrow \qquad (6)$$

The amount of CO gas formation $n^f_{CO}$ (mol) can be known by measuring the composition of the gas flowing out of the reactor. The amount of aluminum nitride formation $n^f_{AlN}$ (mol) can be known by the following formula (7):

$$n^f_{AlN} = \frac{2}{3} n^f_{CO} \qquad (7)$$

wherein $n^f_{CO}$ (mol) is the amount of CO gas formation.

The formula (5) can be rewritten using the formula (7) as follows:

$$R_N = 100 \times \frac{2}{3} \frac{n^f_{CO}}{n^{total}_{Al}} \qquad (5')$$

Thus, the nitridation ratio $R_N$ can be known from the amount of CO gas formation $n^f_{CO}$.

The nitrogen gas-containing atmosphere in the step (i-a) is, as descried above, a mixed gas of 55 to 30 volume % of nitrogen gas and 45 to 70 volume % of a diluting gas, and preferably a mixed gas of 50 to 30 volume % of nitrogen gas and 50 to 70 volume % of a diluting gas. The diluting gas adjusts the proportion of nitrogen gas in the nitrogen gas-containing atmosphere. Examples of the diluting gas include: carbon monoxide gas, an inert gas (such as argon gas), and mixed gas of carbon monoxide gas and an inert gas (such as argon gas)).

In the step (i-a), the more the proportion of the diluting gas in the nitrogen gas-containing atmosphere increases, the longer it takes for the reduction nitridation reaction to complete. The content of the diluting gas in the nitrogen gas-containing atmosphere is thus preferably no more than 70 volume %, in view of production efficiency.

In the step (i-a), the reduction nitridation reaction is preferably carried out while flowing the nitrogen gas-containing gas in the reactor in which the raw material mixture has been placed, and in this case, (the composition of the gas flowing out of the reactor)≈(the gas composition of the atmosphere in which the raw material mixture exists), and thus the proportion of the diluting gas in the nitrogen gas-containing atmosphere in which the raw material mixture exists can be confirmed by measuring the gas composition of the exhaust gas flowing out of the reactor.

In the step (i-a), if the proportion of nitrogen gas in the nitrogen gas-containing atmosphere is greater than 55 volume % (that is, the proportion of the diluting gas is smaller than 45 volume %), the reduction nitridation reaction proceeds fast, which leads to insufficient grain growth, which thus makes it difficult to obtain large-sized aluminum nitride particles and makes it difficult to obtain the aluminum nitride powder of the present invention comprising the aluminum nitride particles having the characteristic shape explained above. Under reaction conditions outside the above range, an aluminum nitride particle comprising a hexagonal cylinder-shaped barrel part and cup-shaped protrusions capping both ends of the barrel part is obtained, and thus the aluminum nitride powder of the present invention cannot be obtained.

In the step (i-a), examples of ways to adjust the proportion of the diluting gas in the nitrogen gas-containing atmosphere include the following (1) and (2):

(1) placing the raw material mixture in a first boat (a boat-shaped vessel whose top is open; such as a vessel made of carbon); arranging the first boat inside the reactor; and supplying a gas comprising nitrogen gas and the diluting gas with the predetermined ratio as the nitrogen gas-containing atmosphere into the reactor; or (2) arranging the first boat loaded with the raw material mixture in the reactor; arranging a second boat (such as a vessel made of carbon) loaded with a mixture of an alumina powder and a carbon powder (a second mixture) on the upstream side of the first boat in the gas flow in the reactor; supplying nitrogen gas or a mixed gas comprising nitrogen gas and the diluting gas into the reactor; generating carbon monoxide gas by reduction nitridation of alumina in the second boat; and supplying a mixed gas of the gas supplied into the reactor and carbon monoxide gas liberated from the second boat to the raw material mixture as the nitrogen gas-containing atmosphere.

FIG. 2 is a cross-sectional view schematically illustrating a reaction apparatus 100 that may be used in the above described embodiment (1). The reaction apparatus 100 includes a tubular reactor 10, a first boat 21 arranged inside the reactor 10, and a first heater 31 heating the inside of the reactor 10, especially the area around the first boat 21.

The reactor 10 is a tubular reactor, and has a gas inlet 11 arranged on the upstream side of the first boat 21, and a gas outlet 12 arranged on the downstream side of the first boat 21. Examples of materials constituting the reactor 10 include carbon.

The first boat 21 is a boat-shaped vessel whose top is open, and a raw material mixture 1 is placed in the first boat 21. Examples of materials constituting the first boat 21 include carbon.

A conventional heater such as a resistance heater and a high-frequency induction heater may be used as the first heater 31 without any specific limitation as long as the raw material mixture 1 can be heated to the predetermined temperature.

In the reaction apparatus 100, a gas supply source (not shown) connected to the gas inlet 11 introduces a gas flow comprising nitrogen gas and the diluting gas at the predetermined proportions from the gas inlet 11 into the reactor 10, and the gas flow is supplied to the raw material mixture 1 placed in the first boat 21 as the nitrogen gas-containing atmosphere. At the same time, the first heater 31 heats the raw material mixture 1 placed in the first boat 21 at the predetermined temperature, such that the reduction nitridation reaction proceeds. An exhausting gas comprising the gas introduced from the gas inlet 11 and a gas liberated from the raw material mixture 1 flows out of the gas outlet 12 to the outside of the reactor 10. The flow rate and composition of the gas flowing out of the gas outlet 12 are measured by a gas analyzer (not shown) connected to the gas outlet 12. The nitridation ratio $R_N$ (formula (5)) can be calculated based on the flow rate and composition of the gas measured by the gas analyzer.

Figure 3:
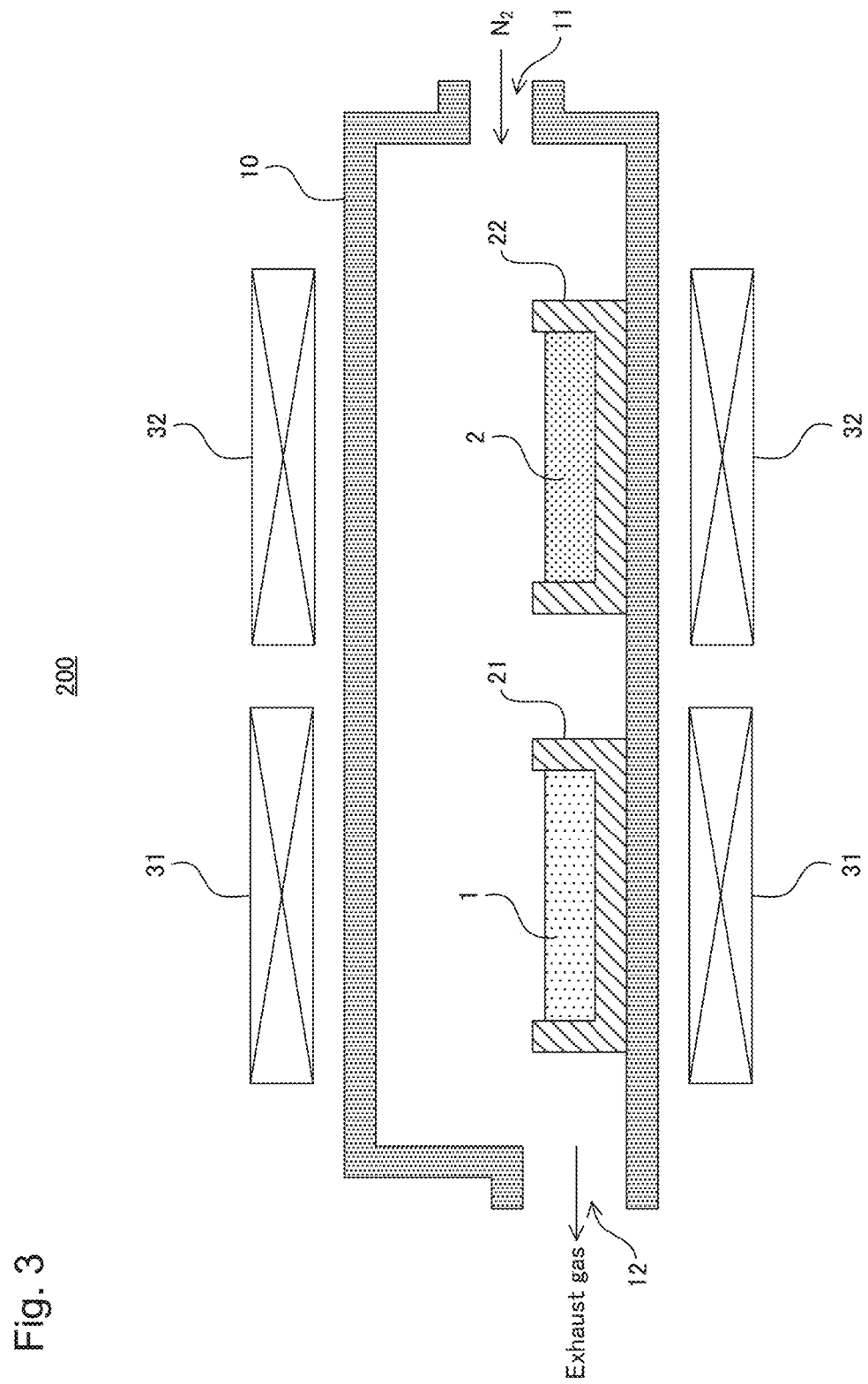
FIG. 3 is a cross-sectional view schematically illustrating a reaction apparatus 200 that may be used for a method for producing an aluminum nitride powder of one embodiment of the present invention.

FIG. 3 is a cross-sectional view schematically illustrating a reaction apparatus 200 that may be used in the above described embodiment (2). In FIG. 3, elements already shown in FIG. 2 are given the same reference signs as in FIG. 2, and the description thereof may be omitted. The reaction apparatus 200 is different from the reaction apparatus 100 (FIG. 2) in that the reaction apparatus 200 further comprises: a second boat 22 loaded with a second mixture 2 and arranged on the downstream side of the gas inlet 11 and the upstream side of the first boat 21 in the reactor 10; and a second heater 32 heating the inside of the reactor 10, especially around the second boat 22.

As the second boat 22 in which the second mixture 2 is placed, a boat-shaped vessel whose top is open may be used like the first boat 21. Examples of materials constituting the second boat 22 include carbon.

The second mixture 2 needs to comprise an alumina powder and a carbon powder such that it can generate CO gas by reduction nitridation of alumina, but does not need to comprise other components (such as a sulfur component). Since the second mixture 2 works exclusively as a CO gas generation source, the nature and amount of the alumina powder and the carbon powder in the second mixture 2 are not particularly limited and can be suitably selected, as long as the nitrogen gas-containing atmosphere having a composition within the predetermine range (nitrogen gas content and carbon monoxide gas content) on the downstream side of the second boat 22 is formed for a desired time. In one embodiment, the ratio of the alumina powder and the carbon powder in the second mixture 2 may be, for example, 36 to 200 parts by weight of the carbon powder, and preferably 40 to 100 parts by weight thereof, to 100 parts by weight of the alumina powder. In one embodiment, the amount of the alumina powder incorporated in the second mixture 2 placed in the second boat 22 may be, for example, 70 to 130 parts by weight per 100 parts by weight of the alumina powder in the raw material mixture 1 placed in the first boat 21.

In the embodiment of the (2), the second mixture needs to be heated, so as to generate CO gas by reduction nitridation of alumina in the second boat 22. The temperature at which the second mixture is heated is not particularly limited as long as a desired amount of CO gas can be generated, and it may be, for example, 1500 to 2000° C.

A conventional heater such as a resistance heater and a high-frequency induction heater may be used as the second heater 32 without any specific limitation as long as the second mixture 2 can be heated to the predetermined temperature.

Nitrogen gas or a mixed gas comprising nitrogen gas and the diluting gas is introduced from the gas inlet 11 into the reactor 10, and the first mixture 1 placed in the first boat 21 and the second mixture 2 placed in the second boat 22 are heated at predetermined temperatures by the first heater 31 and the second heater 32 respectively. This causes reduction nitridation of alumina in the second boat 22 to generate CO gas. A mixed gas of CO gas liberated from the second boat 22 and the gas introduced from the gas inlet 11 into the reactor 10 is supplied to the raw material mixture 1 placed in the first boat 21 as the nitrogen gas-containing atmosphere. An exhaust gas comprising the gas introduced from the gas inlet 11 into the reactor 10, CO gas liberated from the second boat 22, and a gas liberated from the raw material mixture 1 flows out of the gas outlet 12 to the outside of the reactor 10. The flow rate and composition of the gas flowing out of the gas outlet 12 are measured by a gas analyzer (not shown) connected to the gas outlet 12. The nitridation ratio $R_N$ (formula (5)) can be calculated based on the flow rate and composition of the gas measured by the gas analyzer.

The gas which flows out of the gas outlet 12 also comprises CO gas generated by reduction nitridation in the second boat 22 in addition to CO gas generated by reduction nitridation in the first boat 21. The amount of CO gas generated by reduction nitridation in the second boat 22 and time evolution thereof, though, can be known in advance by conducting a preliminary experiment under the same conditions except that the raw material mixture 1 is not placed in the first boat 21. The amount of CO gas generated by reduction nitridation in the first boat 21 thus can be calculated by subtracting the amount of CO gas (known) derived from reduction nitridation in the second boat 22 from the amount of CO gas in the gas which flows out of the gas outlet 12, and thus the nitridation ratio $R_N$ (formula (5)) can be calculated.

In the embodiment of the (2), the supply of carbon monoxide gas from the second boat 22 may become insufficient to temporarily make the proportion of the diluting gas (in one embodiment, carbon monoxide gas) in the nitrogen gas-containing atmosphere supplied to the raw material mixture 1 less than 45 volume % at the initial stage of the reduction nitridation reaction of the raw material mixture 1 in the first boat 21. The inventors, however, have confirmed that the present invention tolerates such a state while the nitridation ratio is less than 5%, and preferably less than 3%. Nevertheless, it is most preferable that the proportion of the diluting gas in the nitrogen gas-containing atmosphere supplied to the raw material mixture 1 be maintained within the above range from the beginning of the reduction nitridation reaction of the raw material mixture 1 in the first boat 21.

In the above explanations, the reaction apparatus 200 comprising separate heaters (the first heater 31 and the second heater 32) for heating of the raw material mixture 1 and the second mixture 2 has been explained as an example, but a reaction apparatus employed in the embodiment of the (2) is not limited to such an embodiment. For example, a reaction apparatus which heats the raw material mixture 1 and the second mixture 2 by means of a common heater may also be employed.

After the nitridation ratio of the alumina powder exceeds 50% in the step (i-a), the proportion of the diluting gas in the nitrogen gas-containing atmosphere may be made less than 45 volume % by stopping or reducing supply of the diluting gas, or the nitridation may be continued to the end under the same conditions (in the nitrogen gas-containing atmosphere, nitrogen gas: 55 to 30 volume %, diluting gas: 45 to 70 volume %).

In one embodiment, the step (i) comprises: (i-b) placing the raw material mixture in a setter and placing the setter in a reactor, the setter comprising: a boat-shaped vessel, a top of the vessel being open; a lid closing the top of the vessel; a first opening arranged on the upstream side in a gas flow direction in the reactor such that a gas can be introduced into the setter; and a second opening arranged on the downstream side in the gas flow direction in the reactor such that a gas can flow out of the setter; (i-b2) supplying nitrogen gas or a mixed gas comprising nitrogen gas and a diluting gas into the reactor; (i-b3) making part of a gas supplied into the reactor flow into the setter through the first opening; (i-b4) forming the nitrogen gas-containing atmosphere in the setter, from a gas flowing into the setter from the first opening and carbon monoxide gas generated by the reduction nitridation of the raw material mixture in the setter; and (i-b5) carrying out the reduction nitridation in the nitrogen gas-containing atmosphere in the setter, while maintaining conditions such that an average nitrogen gas content $p^{avr}_{N2}$ in the nitrogen gas-containing atmosphere in the setter calculated by the following formula (3) becomes 55 to volume % and such that an average diluting gas content $p^{avr}_{dilute}$ in the nitrogen gas-containing atmosphere in the setter calculated by the following formula (4) becomes 45 to 70 volume %, at least while the nitridation ratio is 5 to 50%:

$$p^{avr}_{N_2} = \frac{1}{2}\left(p^{in}_{N_2} + 100 \times \frac{\frac{p^{in}_{N_2}}{100} \cdot \frac{S_{open}}{S_{open}+S_{bypass}} V^{in} - \frac{1}{3}V^f_{CO}}{\frac{S_{open}}{S_{open}+S_{bypass}} V^{in} + \frac{2}{3}V^f_{CO}}\right) \quad (3)$$

$$p^{avr}_{dilute} = \frac{1}{2}\left(p^{in}_{dilute} + 100 \times \frac{\frac{p^{in}_{dilute}}{100} \cdot \frac{S_{open}}{S_{open}+S_{bypass}} V^{in} + V^f_{CO}}{\frac{S_{open}}{S_{open}+S_{bypass}} V^{in} + \frac{2}{3}V^f_{CO}}\right) \quad (4)$$

wherein $p^{in}_{N2}$ (unit: volume %) is a nitrogen gas content of the gas flowing into the setter; $p^{in}_{dilute}$ (unit: volume %) is a diluting gas content of the gas flowing into the setter; $V^{in}$ (unit: μm³/s) is a gas inflow into the reactor; $S_{open}$ (unit: μm²) is a minimum value of a cross section of a gas flow path formed by the first opening of the setter; $S_{bypass}$ (unit: μm²) is a minimum value of a cross section of a gas flow path bypassing the setter; and $V^f_{CO}$ (unit: μm³/s) is a rate of generation of carbon monoxide gas in the setter.

The formulae (3) and (4) are based on approximations explained later. The reason to use the formulae (3) and (4) for calculation of the gas composition in the setter in the present embodiment is that it is difficult to exactly know the amount of gas flowing into the setter and gas flow distributions in the setter and thus the gas composition in the setter cannot be directly calculated only from the amount and consumption of the gas supplied into the reactor and the amount and composition of the gas flowing out of the reactor.

Figure 4:
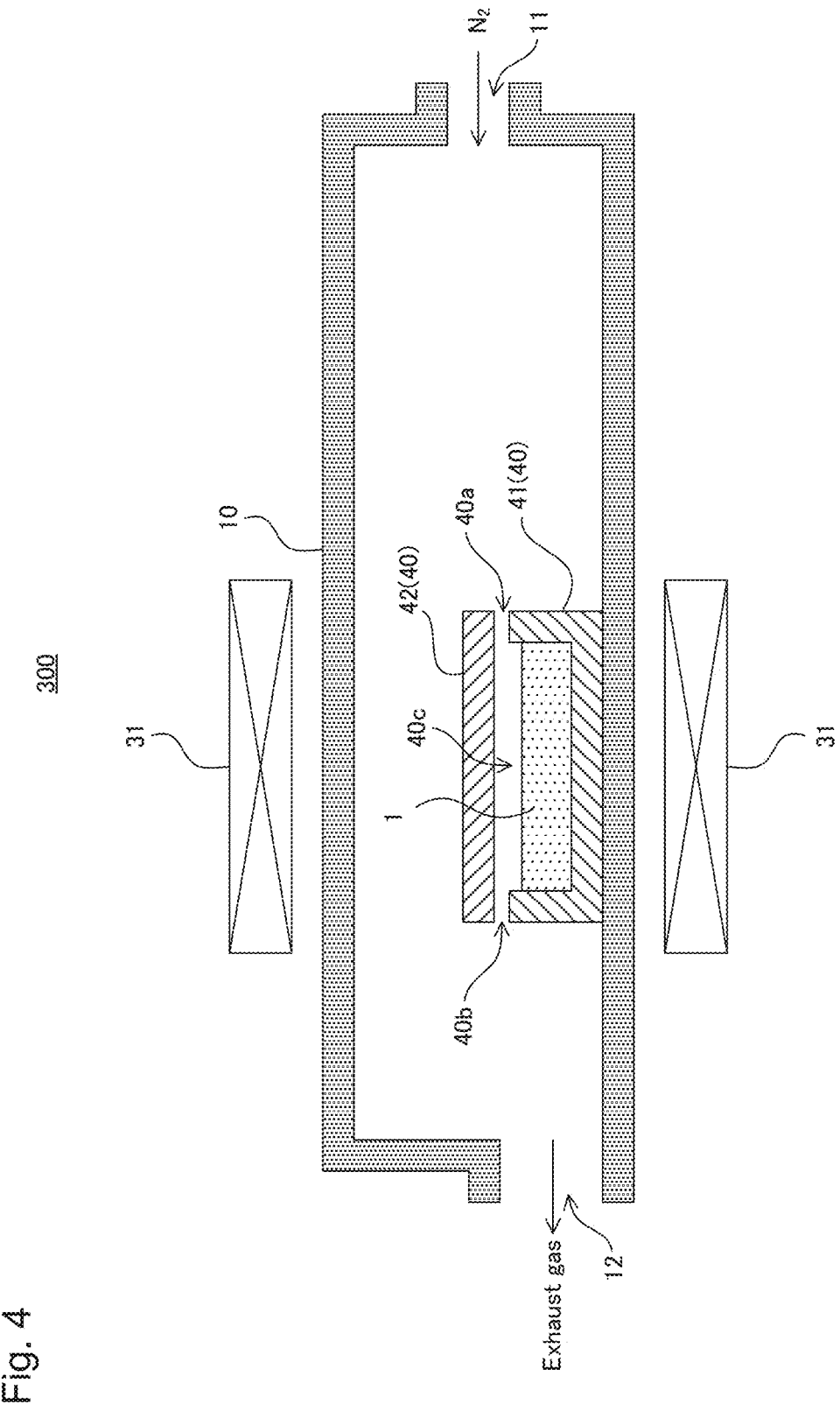
FIG. 4 is a cross-sectional view schematically illustrating a reaction apparatus 300 that may be used for a method for producing an aluminum nitride powder of one embodiment of the present invention.

FIG. 4 is a cross-sectional view schematically illustrating a reaction apparatus 300 that may be used in an embodiment including the steps (i-b1) to (i-b5). In FIG. 4, elements already shown in FIGS. 2 and 3 are given the same reference signs as in FIGS. 2 and 3, and the description thereof may be omitted. The reaction apparatus 300 is different from the reaction apparatus 100 (FIG. 2) in that a setter 40 instead of the first boat 21 is arranged in the tubular (horizontal) reactor 10 and the raw material mixture 1 is placed in the setter 40.

Figure 5A:
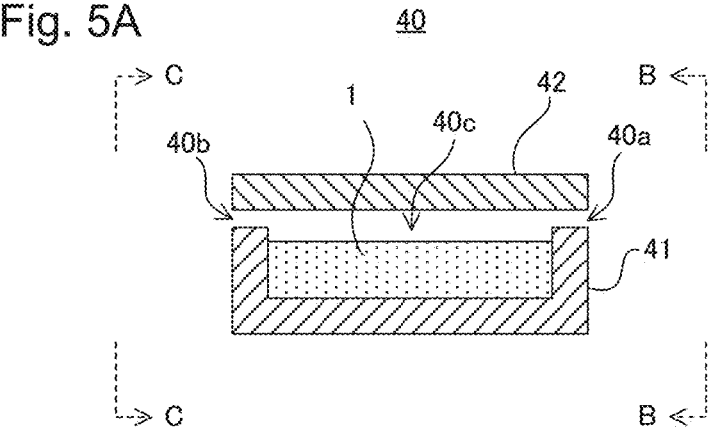
FIG. 5A shows a setter 40 extracted from FIG. 4.
Figure 5B:
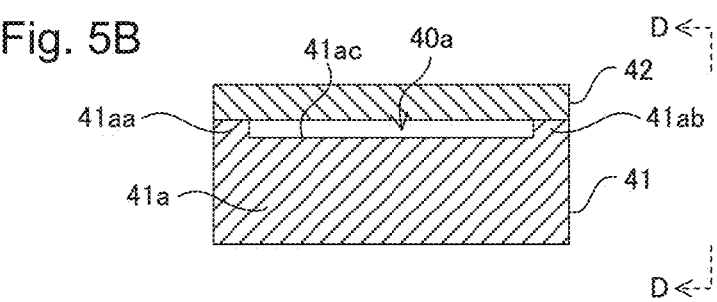
FIG. 5B shows the setter viewed along the arrows B-B in FIG. 5A.
Figure 5C:
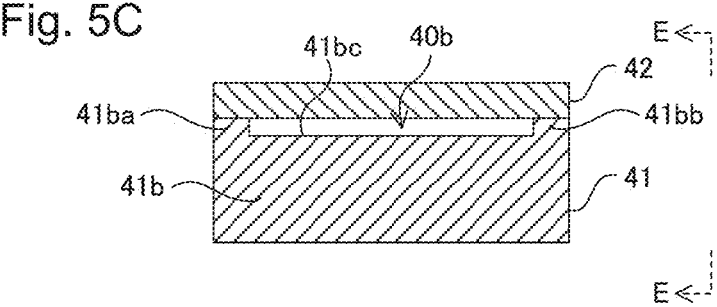
FIG. 5C shows the setter 40 viewed along the arrows C-C in FIG. 5A.
Figure 5D:
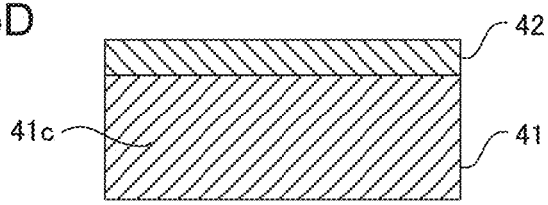
FIG. 5D shows the setter 40 viewed along the arrows D-D in FIG. 5B.
Figure 5E:
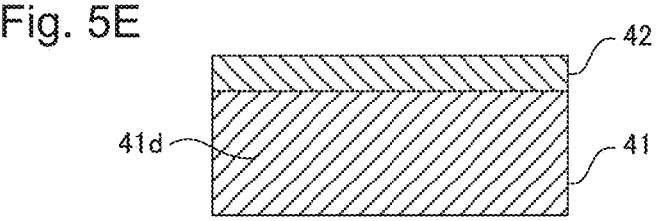
FIG. 5E shows the setter 40 viewed along the arrows E-E in FIG. 5C.

FIGS. 5A to 5E schematically illustrate the setter 40. In FIG. 5, elements already shown in FIGS. 2 to 4 are given the same reference signs as in FIGS. 2 to 4, and the description thereof may be omitted. FIG. 5A is a cross-sectional view schematically illustrating the setter 40, which shows the same cross section as FIG. 4. In FIG. 5A, the right side of the sheet is the upstream side of a gas flow, and the left side of the sheet is the downstream side of the gas flow. The setter 40 comprises a boat-shaped vessel 41 whose top is open, and a lid 42 closing the top of the vessel 41. FIG. 5B shows FIG. 5A viewed along the arrows B-B, which shows a first side face 41a of the vessel 41, and a first opening 40a. FIG. 5C shows FIG. 5A viewed along the arrows C-C, which shows a second side face 41b of the vessel 41, which is on the opposite side of the first side face 41a, and a second opening 40b. FIG. 5D shows FIG. 5B viewed along the arrows D-D, which shows a third side face 41c of the vessel 41. FIG. 5E shows FIG. 5C viewed along the arrows E-E, which shows a fourth side face 41d of the vessel 41, which is on the opposite side of the third side face 41c.

As shown in FIG. 5B, among upper ends 41aa, 41ab and 41ac of a wall member constituting the first side face 41a which is arranged on the upstream side of the gas flow in the reactor 10, both ends 41aa and 41ab in the horizontal direction crossing the gas flow direction are higher than the part 41ac sandwiched between the both ends 41aa and 41ab. Thus, when the lid 42 is placed on the top of the vessel 41, a slit-shaped opening (the first opening) 40a is formed between the upper end 41ac of the first side face 41a and the lid 42.

As shown in FIG. 5C, among upper ends 41ba, 41bb and 41bc of a wall member constituting the second side face 41b which is arranged on the downstream side of the gas flow in the reactor 10, both ends 41ba and 41bb in the horizontal direction crossing the gas flow direction are higher than the part 41bc sandwiched between both ends 41ba and 41bb. Thus, when the lid 42 is placed on the top of the vessel 41, a slit-shaped opening (a second opening) 40b is formed between the upper end 41bc of the second side face 41b and the lid 42.

The setter 40 is arranged in the reactor 10 such that the first side face 41a faces the upstream side of the gas flow direction, and the second side face 41b faces the downstream side of the gas flow direction. In the reaction apparatus 300, the setter 40 comprises: the first opening 40a arranged on the upstream side of the gas flow direction such that a gas can be introduced into the setter therethrough; and the second opening 40b arranged on the downstream side of the gas flow direction such that a gas can flow out of the setter therethrough. Examples of materials constituting the setter 40 include carbon.

Figure 6:
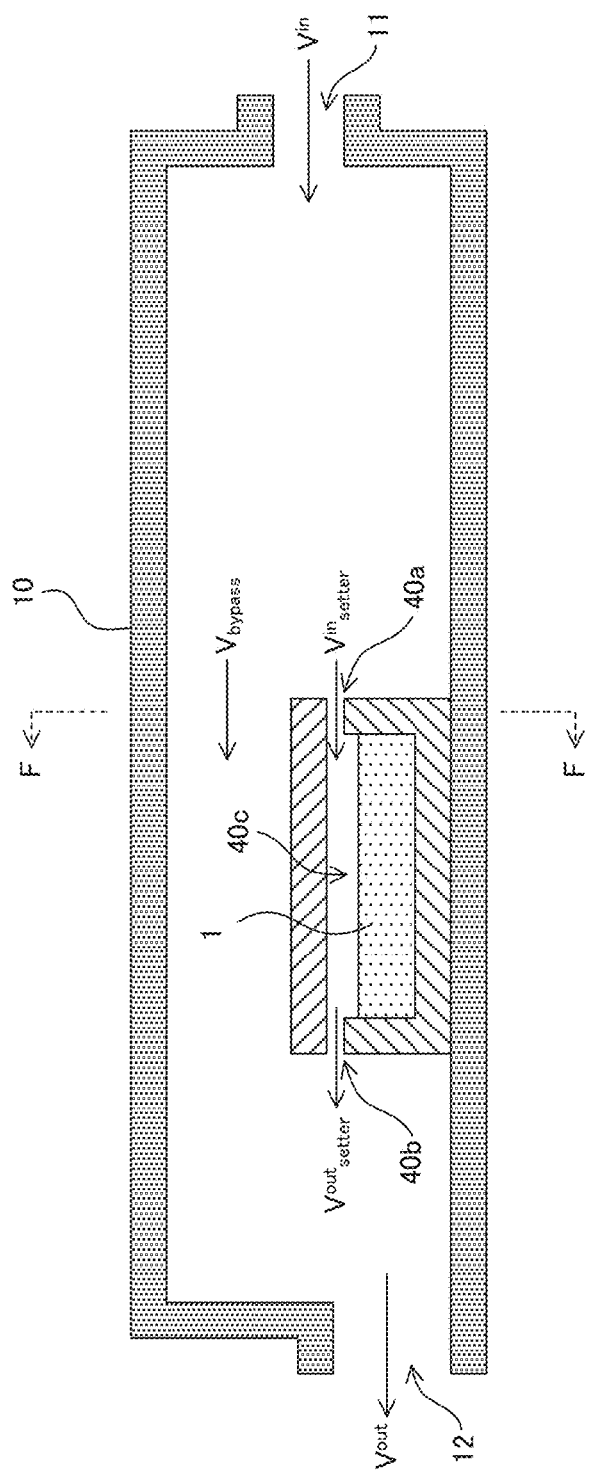
FIG. 6 is FIG. 4 from which a first heater 31 is excluded, to illustrate gas flows in the reaction apparatus 300.

FIG. 6 shows FIG. 4 from which the first heater 31 is excluded. In FIG. 6, elements already shown in FIGS. 2 to 5 are given the same reference signs as in FIGS. 2 to 5, and the description thereof may be omitted. Nitrogen gas or a mixed gas comprising nitrogen gas and the diluting gas is supplied from the gas inlet 11 to the inside of the reactor 10 (gas inflow $V^{in}$ (m³/s); step (i-b2)). Examples of the diluting gas include, as described above, carbon monoxide gas, an inert gas (such as argon gas), and mixed gas of carbon monoxide gas and an inert gas (such as argon gas)). Part of the gas flowing into the reactor 10 from the gas inlet 11 flows into the setter 40 from the first opening 40a (gas inflow $V^{in}_{setter}$ (m³/s); step (i-b3)), the balance thereof bypasses the setter 40 and goes to the downstream side of the setter 40 (gas bypass flow $V_{bypass}$ (m³/s)). A gas flowing out of the second opening 40b of the setter 40 (gas outflow $V^{out}_{setter}$ (m³/s)), and the gas bypassing the setter 40 ($V_{bypass}$) join and flow out of the gas outlet 12 to the outside of the reactor 10 (gas outflow $V^{out}$ (m³/s)). That is, $$V^{in} = V^{in}_{setter} + V_{bypass} \qquad (8)$$

$$V^{out} = V^{out}_{setter} + V_{bypass} \qquad (9)$$

wherein $V^{in}$ (m³/s) is a gas inflow into the reactor 10; $V^{in}_{setter}$ (m³/s) is a gas inflow into the setter 40; $V_{bypass}$ (m/s) is a gas flow of the gas bypassing the setter 40; $V^{out}_{setter}$ (m³/s) is a gas outflow from the setter 40; and $V^{out}$ (m³/s) is a gas outflow from the reactor 10.

Figure 7:
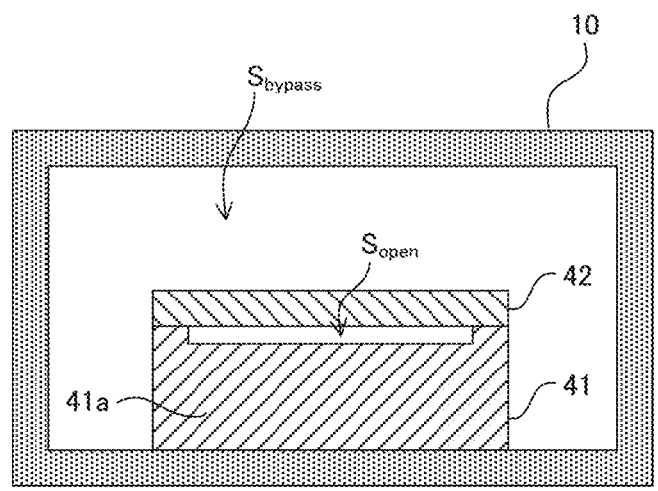
FIG. 7 is a cross-sectional view along the arrows F-F in FIG. 6.

FIG. 7 is a cross-sectional view taken along the line F-F in FIG. 6. In FIG. 7, elements already shown in FIGS. 2 to 6 are given the same reference signs as in FIGS. 2 to 6, and the description thereof may be omitted. FIG. 7 shows a cross section crossing (perpendicularly crossing) the gas flow direction at the position of the first opening 40a of the setter 40. The gas inflow into the setter 40 $V^{in}_{setter}$, and the gas flow of the gas bypassing the setter 40 $V_{bypass}$ (see FIG. 6) can be approximated by the following formulae, wherein $S_{open}$ (m²) is the minimum value of the cross section of the gas flow path formed by the first opening 40a, and $S_{bypass}$ (m²) is the minimum value of the cross section of the gas flow path bypassing the setter 40. The cross section of the gas flow path means an area of a section crossing the gas flow direction. Usually, an average linear velocity of the gas flow flowing into the setter 40 at the first opening 40a is not greater than an average linear velocity of the gas flow at a section of the gas flow path at which the cross section is minimum (=$S_{bypass}$) in the gas flow path bypassing the setter 40.

$$v^{in}_{setter} = \frac{S_{open}}{S_{open} + S_{bypass}} V^{in} \qquad (10)$$

$$v_{bypass} = \frac{S_{bypass}}{S_{open} + S_{bypass}} V^{in} \qquad (11)$$

Since the reduction nitridation reaction of alumina by the carbon powder is represented by the formula (6), nitrogen gas is consumed and carbon monoxide gas is formed in the setter 40. In a steady state, the gas outflow from the setter 40 $V^{out}_{setter}$ is represented by the following formula:

$$V^{out}_{setter} = V^{in}_{setter} - V^{c}_{N_2} + V^{f}_{CO} \qquad (12)$$

wherein $V^{c}_{N_2}$ (m³/s) is the nitrogen gas consumption in the setter 40; and $V^{f}_{CO}$ (m³/s) is the rate of generation of carbon monoxide gas in the setter 40. From the formula (6), the relation between the nitrogen gas consumption and the rate of generation of carbon monoxide gas is represented by the following formula:

$$V_{N_2}^c = \tfrac{1}{3} V_{CO}^f \quad (13)$$

The nitrogen gas content $p^{out}_{N_2}$ (volume %) and the diluting gas content $p^{out}_{dilute}$ (volume %) in the gas flowing out of the setter 40 are represented by the following formulae:

$$p^{out}_{N_2} = 100 \times \frac{\frac{p^{in}_{N_2}}{100} \cdot V^{in}_{setter} - V^c_{N_2}}{V^{out}_{setter}} \quad (14)$$

$$p^{out}_{dilute} = 100 \times \frac{\frac{p^{in}_{dilute}}{100} \cdot V^{in}_{setter} + V^f_{CO}}{V^{out}_{setter}} \quad (15)$$

wherein $p^{in}_{N_2}$ (volume %) is the nitrogen gas content of the gas flowing into the setter 40; and $p^{in}_{dilute}$ (volume %) is the diluting gas content of the gas flowing into the setter 40.

In the space (gas phase region) 40c in the setter 40, the gas flow flows from the first opening 40a to the second opening 40b. Nitrogen gas is absorbed from the gas flow flowing through the gas phase region 40c by the raw material mixture 1 and is consumed by the reduction nitridation reaction, and carbon monoxide gas formed by the reduction nitridation reaction is liberated from the raw material mixture 1 into the gas phase region 40c. Thus, an average nitrogen gas content $p^{avr}_{N_2}$ (volume %) and an average diluting gas content $p^{avr}_{dilute}$ (volume %) in the nitrogen gas-containing atmosphere in the space (gas phase region) 40c in the setter 40 are represented by the formulae (16) and (17) as average values of the composition of the gas flowing into the setter 40 and the composition of the gas flowing out of the setter 40:

$$p_{N_2}^{avr} = \tfrac{1}{2}(p_{N_2}^{in} + p_{N_2}^{out}) \quad (16)$$

$$p_{dilute}^{avr} = \tfrac{1}{2}(p_{dilute}^{in} + p_{dilute}^{out}) \quad (17)$$

Based on the formulae (14) and (15), and the formulae (10), (12) and (13), the formulae (16) and (17) are transformed as:

$$p_{N_2}^{avr} = \frac{1}{2}\left( p^{in}_{N_2} + 100 \times \frac{\frac{p^{in}_{N_2}}{100} \cdot \frac{S_{open}}{S_{open}+S_{bypass}} V^{in} - \tfrac{1}{3} V^f_{CO}}{\frac{S_{open}}{S_{open}+S_{bypass}} V^{in} + \tfrac{2}{3} V^f_{CO}} \right) \quad (3)$$

$$p_{dilute}^{avr} = \frac{1}{2}\left( p^{in}_{dilute} + 100 \times \frac{\frac{p^{in}_{dilute}}{100} \cdot \frac{S_{open}}{S_{open}+S_{bypass}} V^{in} + V^f_{CO}}{\frac{S_{open}}{S_{open}+S_{bypass}} V^{in} + \tfrac{2}{3} V^f_{CO}} \right) \quad (4)$$

Each term in the formulae is as defined above. Thus, the gas flowing from the first opening 40a into (the gas phase region 40c of) the setter 40 and carbon monoxide gas liberated from the raw material mixture 1 in the setter 40 by reduction nitridation form a nitrogen gas-containing atmosphere (average nitrogen gas content: $p^{avr}_{N_2}$ (volume %), average diluting gas content: $p^{avr}_{dilute}$ (volume %)) in the setter (step (i-b4)).

In the present embodiment, the reduction nitridation reaction of the raw material mixture 1 is conducted under the nitrogen gas-containing atmosphere in the setter 40, maintaining conditions such that the average nitrogen gas content $p^{avr}_{N_2}$ calculated by the formula (3) becomes 55 to 30 volume % and the average diluting gas content $p^{avr}_{dilute}$ calculated by the formula (4) becomes 45 to 70 volume % for the nitrogen gas-containing atmosphere in the gas phase region 40c in the setter 40, at least while the nitridation ratio is 5 to 50% (step (i-b5)). If the average nitrogen gas content $p^{avr}_{N_2}$ exceeds 55 volume % (i.e., the average diluting gas content $p^{avr}_{dilute}$ is less than 45 volume %) in the step (i-b5), the reduction nitridation reaction proceeds fast, which leads to insufficient grain growth, which makes it difficult to obtain large-sized aluminum nitride particles, as well as makes it difficult to obtain the aluminum nitride powder of the present invention comprising the aluminum nitride particle having the characteristic shape explained above. Under reaction conditions outside the above range, an aluminum nitride particle comprising a hexagonal cylindrical barrel part and cup-shaped protrusions capping both ends of the barrel part is obtained, which means that the aluminum nitride powder of the present invention cannot be obtained. In view of production efficiency, the average diluting gas content $p^{avr}_{dilute}$ in the nitrogen gas-containing atmosphere is preferably maintained to be no more than 70 volume %, since the more the proportion of the diluting gas in the nitrogen gas-containing atmosphere increases, the longer it takes for the reduction nitridation reaction to complete.

Controllable variables in the present embodiment are: the nitrogen gas content of the gas flowing into the setter 40 $p^{in}_{N_2}$ (volume %); the diluting gas content of the gas flowing into the setter 40 $p^{in}_{dilute}$ (volume %); the gas inflow into the reactor 10 $V^{in}$ (m³/s); the minimum value of the cross section of the gas flow path formed by the first opening 40a of the setter 40 $S_{open}$ (m²); the minimum value of the cross section of the gas flow path bypassing the setter 40 $S_{bypass}$ (m²); and the rate of generation of carbon monoxide gas in the setter 40 $V^f_{CO}$ (m³/s). Among them, $S_{open}$ and $S_{bypass}$ are generally constants determined by the apparatus, and thus easily controllable variables are $p^{in}_{N_2}$, $p^{in}_{dilute}$, $V^{in}$ and $V^f_{CO}$. The rate of generation of carbon monoxide gas $V^f_{CO}$ (m³/s) can be, for example, controlled by adjusting the temperature at which the raw material mixture 1 is heated. Higher heating temperatures of the raw material mixture 1 tend to lead to increased $V^f_{CO}$. In the present embodiment, the average nitrogen gas content $p^{avr}_{N_2}$ (formula (3)) is preferably 50 to 30 volume %, and the average diluting gas content $p^{avr}_{dilute}$ (formula (4)) is preferably 50 to 70 volume %.

In the formulae (3) and (4), the nitrogen gas content of the gas flowing into the setter 40 $p^{in}_{N_2}$ (volume %), and the diluting gas content of the gas flowing into the setter 40 $p^{in}_{dilute}$ (volume %) may be such that $p^{in}_{N_2}$=100 volume % and $p^{in}_{dilute}$=0 volume % in one embodiment; and $0<p^{in}_{N_2}<100$ volume %, $0<p^{in}_{dilute}<100$ volume % and $p^{in}_{N_2}+p^{in}_{dilute}$=100 volume % in another embodiment.

In one embodiment, the composition of the gas flowing into the setter 40 is the same as the composition of the gas supplied to the reactor 10. For example, one may supply only nitrogen gas to the reactor 10 from the gas inlet 11 and allow the nitrogen gas to flow into the setter 40 as it is. For another example, one may supply a mixed gas of nitrogen gas and a diluting gas (e.g., carbon monoxide gas, or an inert gas such as argon gas or any combination thereof) to the reactor 10 from the gas inlet 11 and allow the mixed gas to flow into the setter 40 as it is.

In another embodiment, the composition of the gas flowing into the setter 40 may be different from the composition of the gas supplied to the reactor 10. For example, one may arrange the second boat 22 (see FIG. 3) loaded with the second mixture 2 comprising the alumina powder and the carbon powder on the upstream side of the gas flow (right side of the sheet of FIG. 4) of the setter 40 in the reactor 10, and may allow the mixed gas of the gas supplied from the gas inlet 11 to the reactor 10, and carbon monoxide gas generated from the second mixture 2 by reduction nitridation to flow into the setter 40 arranged on the downstream side of the gas flow of the second mixture 2. In such an embodiment, the composition of the gas flowing into the setter 40 and time evolution thereof can be known by conducting a preliminary experiment as has been explained above for the embodiment employing the reaction apparatus 200.

In the step (i-b1), the proportion of the region filled with the raw material mixture 1 (bulk volume including voids between particles) in the inner space of the setter 40 demarcated by the vessel 41 and the lid 42 (hereinafter may be referred to as "setter filling ratio") is preferably 10 to 95 volume %. The setter filling ratio being no less than this lower limit makes it easy to increase the average diluting gas content $p^{avr}_{dilute}$ in the space 40c in the setter 40. From the same point of view, the setter filling ratio is more preferably no less than 30 volume %, and further preferably no less than 50 volume %. The setter filling ratio being no more than this upper limit makes it easy for nitrogen gas to sufficiently diffuse from the gas phase region 40c in the setter 40 to the bottom of the setter 40. From the same point of view, the setter filling ratio is more preferably no more than 90 volume %.

In the step (i-b1), the thickness of the raw material mixture 1 placed in the setter 40 is not particularly limited as long as the average nitrogen gas content $p^{avr}_{N2}$ and the average diluting gas content $p^{avr}_{dilute}$ can be controlled to be within the above range, and is preferably no less than 20 mm, and especially preferably no less than 70 mm. The thickness of the raw material mixture 1 placed in the setter 40 being no less than this lower limit makes it easy to increase the average diluting gas content $p^{avr}_{dilute}$ in the space 40c in the setter 40. The thickness of the raw material mixture 1 placed in the setter 40 is not particularly limited as long as the top surface of the raw material mixture 1 is below the first opening 40a and the second opening 40b, and is preferably no more than 200 mm, and especially preferably no more than 150 mm. The thickness of the raw material mixture 1 being no more than this upper limit makes it easy for nitrogen gas to sufficiently diffuse from the gas phase region 40c in the setter 40 to the bottom of the setter 40.

After the nitridation ratio of the alumina powder exceeds 50% in the step (i-b5), the average diluting gas content $p^{avr}_{dilute}$ (formula (4)) may be made less than 45 volume % by stopping or reducing supply of the diluting gas to the reactor 10, or the nitridation may be continued to the end under the same conditions.

In any embodiment, the aluminum nitride powder after the reduction nitridation reaction (after completion of the steps (i) and (ii)) comprises a residual carbon powder. It is thus preferable to further carry out the step of removing the residual carbon powder by oxidation treatment, if necessary. As an oxidizing gas for the oxidation treatment, any gas which can remove carbon, such as air and oxygen, may be employed without particular limitation. Treatment temperatures of the oxidation treatment are preferably 500° C. to 900° C.

EXAMPLES

Hereinafter the present invention will be more specifically described based on Examples. The present invention is not limited to these Examples.

Properties of raw materials used in Examples and Comparative Examples are as follows:
(Alumina Powder)
α-alumna A (D50: 0.883 μm)
α-alumina B (D50: 3.518 μm)
(Carbon Powder)
Carbon powder A (average particle size: 19 nm; DBP oil absorption: 116 cm³/100 g; and sulfur content: 210 ppm)
Carbon powder B (average particle size: 20 nm; DBP oil absorption: 115 cm³/100 g; and sulfur content: 3000 ppm)
(Sulfur Component)
Sulfur powder (purity: no less than 98%)
The properties in Examples and Comparative Examples were measured by the following method:

(1) the longer diameter L (m), the shorter diameter D (μm), the proportion of the first plane(s), and the proportion of the second plane(s) of an aluminum nitride particle A SEM micrograph (acceleration voltage: 15 kV, secondary electron detection, 500 times magnification) of an aluminum nitride particle was taken using a scanning electron microscope (TM3030 manufactured by Hitachi High-Technologies Corporation). The longer diameter L (m) and the shorter diameter D (m) of the particle (the longer diameter and the shorter diameter of a region the particle occupied in the SEM micrograph) were measured by image analysis of the SEM micrograph. And also, an analytical drawing of planes surrounded by ridge or valley parts (see FIG. 1B) was prepared by image analysis of the SEM micrograph, and the proportion of the total area of (a) plane(s) (first plane) meeting S/L≥1.0 μm wherein the area S (μm²) the single plane occupied in the SEM image to the area the aluminum nitride particle occupied in the SEM image was calculated, and the proportion of the total area of (a) plane(s) (second plane) meeting S/L²≥0.05 wherein the area S (m²) the single plane occupied in the SEM image to the area the aluminum nitride particle occupied in the SEM image was calculated.

(2) Void(s) Existing Between Aluminum Nitride Particles

Aluminum nitride particles were filled in an epoxy resin. The resin was cast into a mold and set by heat press, to prepare a sheet of 100 m in thickness.

The sheet comprising aluminum nitride particles filled and kept in the resin was cut at regular intervals of 5 μm, cutting the aluminum nitride particles together with the resin. SEM observation of each ground surface confirmed that any cross section of a void having an area equivalent to or greater than an area of a circle of 5 m in diameter was not observed.

(3) Rare Earth Metal Impurity Content in Aluminum Nitride Particles

The aluminum nitride powder was subjected to alkali fusion. The product of the alkali fusion was neutralized by an acid. A rare earth metal impurity (yttrium) content in the aluminum nitride particles was quantified by means of ICP atomic emission spectrometer (ICPS-7510 manufactured by SHIMADZU CORPORATION).

(4) Proportion of Aluminum Nitride Particles of Present Invention Comprised in Aluminum Nitride Powder A SEM micrograph (acceleration voltage: 15 k secondary electron detection, 500 times magnification) of an aluminum nitride particle was taken using a scanning electron microscope (TM3030 manufactured by Hitachi High-Technologies Corporation). Based on the SEM micrograph, the proportion of aluminum nitride particles of the present invention comprised in the aluminum nitride powder was calculated.

Example 1

To a mixture of an alumina powder (100 parts by weight) and a carbon powder (50 parts by weight), a sulfur powder was added such that a sulfur content in the mixture became 5 parts by weight per 100 parts by weight of the alumina powder. The mixture was uniformly mixed by means of a vibration mixer to obtain a raw material mixture.

The raw material mixture was placed in a boat made of carbon such that the thickness of the mixture became 20 mm. The boat was placed in a reactor. Reduction nitridation was conducted while flowing a nitrogen gas-containing gas (composition: 47 volume % of nitrogen gas and 53 volume % of carbon monoxide gas) in the reactor at a heating temperature of 1775° C.

After completion of the reduction nitridation reaction, the system was kept for 5 hours maintaining the heating temperature at the time the reduction nitridation reaction was completed. Then, the system was allowed to cool, and thereafter the reaction product was taken out of the reactor.

The reaction product was heated at 700° C. for 5 hours in the air to burn and remove unreacted carbon powder, to obtain an aluminum nitride powder of the present invention. The composition of the raw material mixture and the proportion of carbon monoxide gas in the nitrogen gas-containing atmosphere is shown in Table 1.

FIG. 1A is a SEM micrograph of the aluminum nitride particles of the present invention contained in the aluminum nitride powder obtained in Example 1. The content $R_v$ of the aluminum nitride particles of the present invention in the aluminum nitride powder was 72 volume %. From the obtained aluminum nitride powder, 10 aluminum nitride particles of the present invention were randomly selected, and the longer diameters L and the shorter diameters S thereof were measured according to the foregoing measuring method. An analytical drawing of planes surrounded by ridge or valley parts (see FIG. 1B) was prepared for each particle based on the SEM micrograph, and the proportion of the total area of (a) plane(s) (first plane) meeting S/L≥1.0 μm wherein the area S (μm$^2$) the single plane existing on the particle surfaces occupied in the SEM image to the area all the aluminum nitride particles occupied in the SEM image was calculated. Further, it was confirmed whether a cross section of any void having an equivalent circle diameter of no less than 5 m was observed or not in the particles of the aluminum nitride powder. Still further, the rare earth metal impurity content in the aluminum nitride particles was measured. The results are shown in Table 2.

Examples 2 to 7

The aluminum nitride powder of the present invention was obtained in the same manner as in Example 1 except that the composition of the raw material and the proportion of carbon monoxide gas in the nitrogen gas-containing atmosphere were changed as in Table 1. The proportion of the aluminum nitride particles of the present invention comprised in the aluminum nitride powder, the particle size of the aluminum nitride particles, the proportion of the first plane(s), and the proportion of the second plane(s) of the obtained aluminum nitride powder were measured. And also, it was confirmed whether a cross section of any void having an equivalent circle diameter of no less than 5 m was observed or not in the particles of the aluminum nitride powder. The results are shown in Table 2.

The same amount of the same alumina powder and the same amount of the same carbon powder were used in Examples 2 and 3, but the amounts of the sulfur component in the mixture therein were 1 part by weight, and 5 parts by weight, respectively, per 100 parts by weight of the alumina powder. In Table 2, the proportion of the aluminum nitride particles of the present invention in the aluminum nitride powder is higher in Example 2. This is because more particle aggregates having a particle size of approximately 20 to 100 m were obtained in Example 3 than in Example 2.

Comparative Example 1

Figure 8:
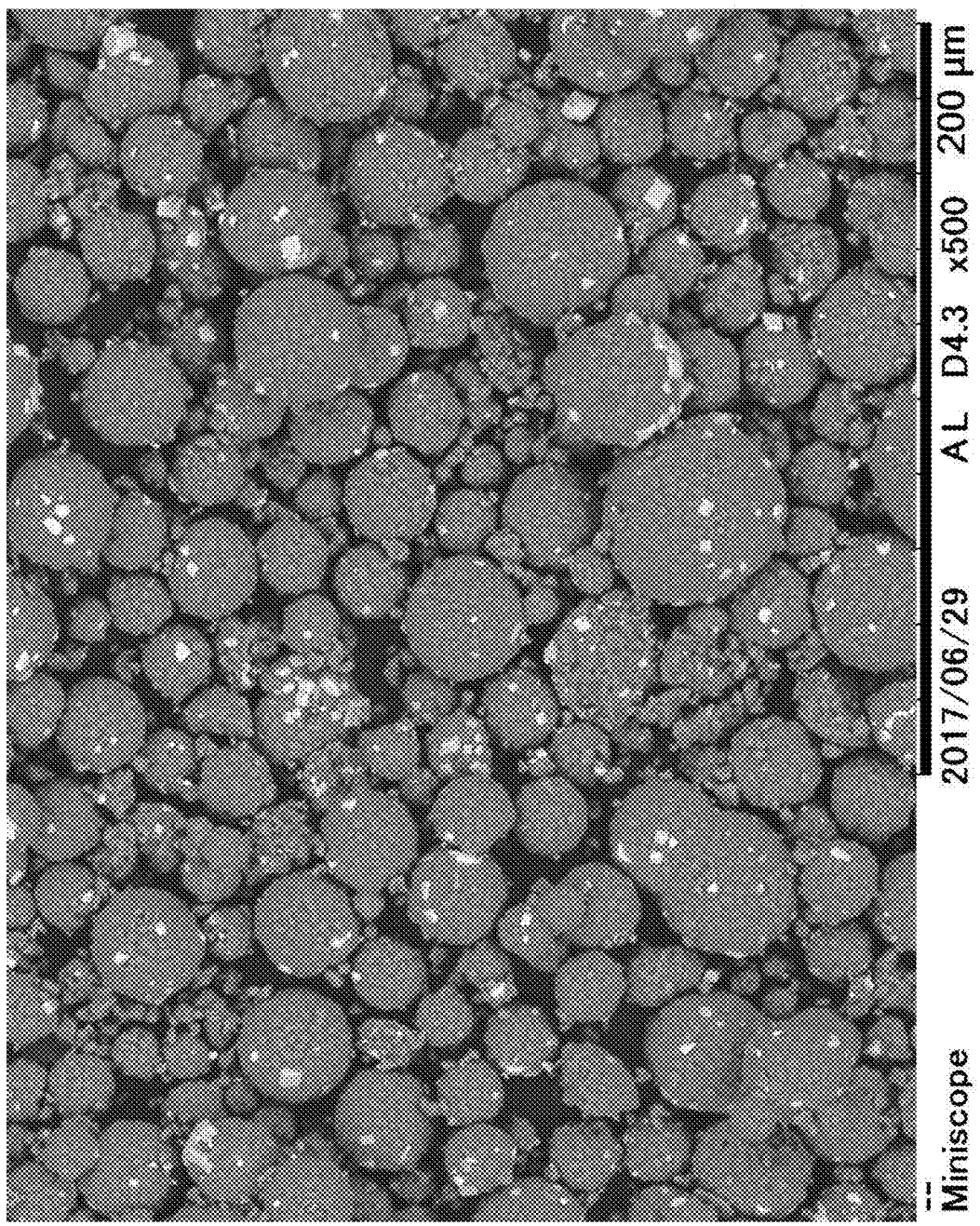
FIG. 8 is a SEM micrograph of aluminum nitride powder particles obtained in Comparative Example 1 (acceleration voltage: 15 k, reflection electron detection, 500 times magnification).

Yttrium oxide as a sintering aid, an organic binder, and a solvent were admixed to an aluminum nitride powder to make a slurry, thereafter to obtain a globular granulated powder having an average particle size of approximately 80 m by means of a spray dryer. After the globular granulated powder was dried at 100° C., the organic binder was burned and removed from the globular granulated powder in the oxygen atmosphere at 500° C., and this globular granulated powder was sintered at 1750° C., to produce an aluminum nitride powder made of sintered granules. FIG. 8 is a SEM micrograph of the obtained aluminum nitride sintered granules (acceleration voltage: 15 kV, reflection electron detection, 500 times magnification). From the obtained aluminum nitride powder, 10 sintered granules were randomly selected, to conduct measurement same as in Examples. The results are shown in Table 2.

As a result of image analysis of the SEM micrograph, any characteristic plane unique to the aluminum nitride particle of the present invention was not observed, and it was found that the aluminum nitride particle of the present invention was not obtained. In addition, a cross section of some void having a diameter (equivalent circle diameter) of no less than 5 m was observed inside the particles.

Comparative Example 2

Figure 9:
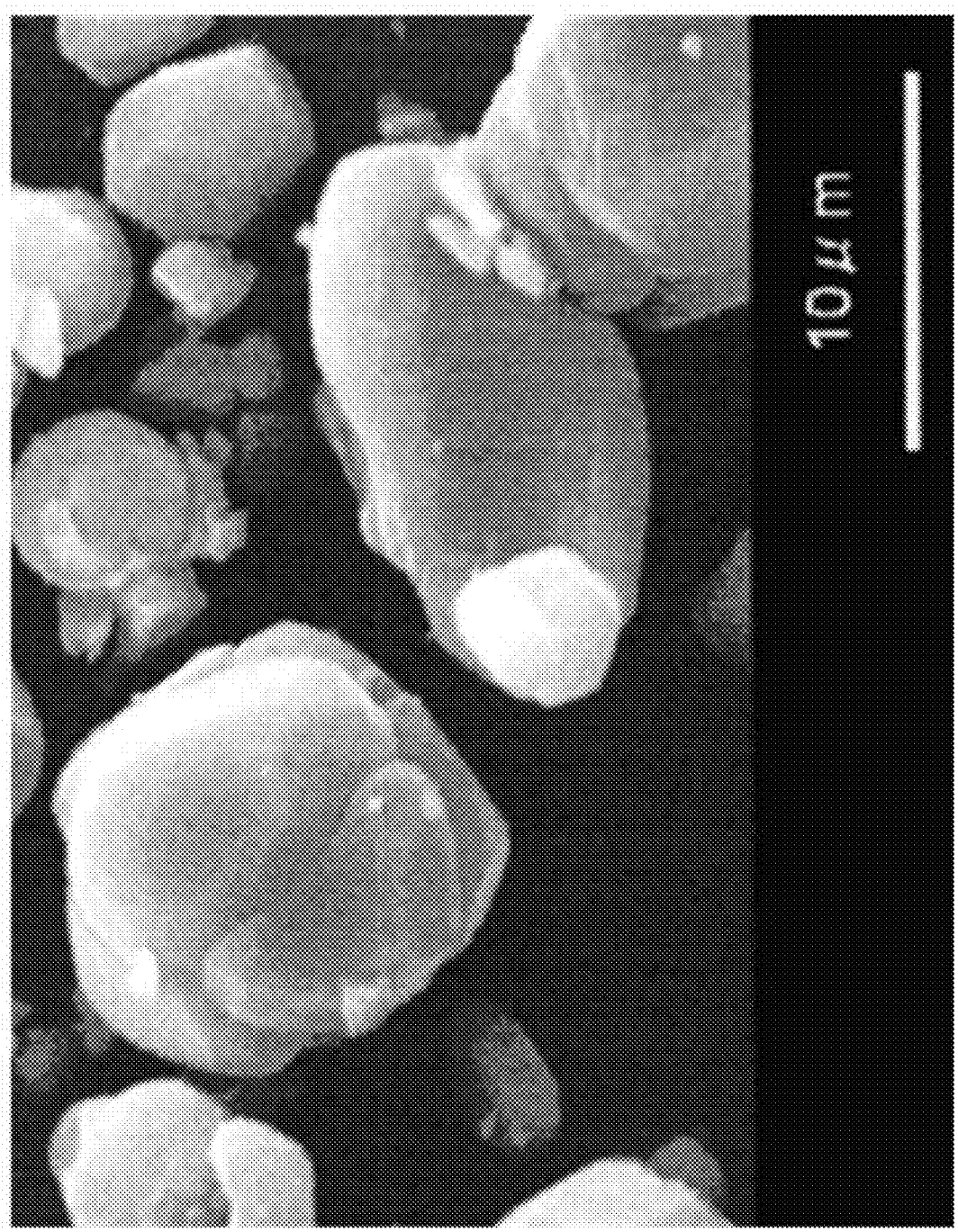
FIG. 9 is a SEM micrograph of aluminum nitride powder particles obtained in Comparative Example 2 (acceleration voltage: 25 k, secondary electron detection).

A mixed powder of an alumina powder (100 parts by weight), a carbon powder (42 parts by weight), and yttrium oxide (5 parts by weight), which is a rare earth metal compound, as a co-melting agent was subjected to reduction nitridation at 1700° C. for 15 hours, to produce an aluminum nitride powder. FIG. 9 is a SEM micrograph of particles constituting the obtained aluminum nitride powder (acceleration voltage: 25 kV, secondary electron detection). From the obtained aluminum nitride powder, 10 particles were randomly selected, to conduct measurement same as in Examples. The results are shown in Table 2.

As a result of image analysis of the SEM micrograph, no particle having a longer diameter L of no less than 20 μm was observed. Any characteristic plane unique to the aluminum nitride particle of the present invention was not observed either, and it was found that the aluminum nitride particle of the present invention was not obtained. In addition, the rare earth metal impurity content of the aluminum nitride particles was 45400 ppm.

Comparative Example 3

Yttrium oxide as a sintering aid, an organic binder, and a solvent were admixed to an aluminum nitride powder to make a slurry, thereafter to obtain a globular granulated powder having an average particle size of approximately m by means of a spray dryer. After the globular granulated powder was dried at 100° C., the organic binder was burned and removed from the globular granulated powder in the oxygen atmosphere at 500° C., and this globular granulated powder was sintered at 1750° C., to produce an aluminum nitride powder made of sintered granules. From the obtained aluminum nitride powder, 10 sintered granules were randomly selected, to conduct measurement same as in Examples. The results are shown in Table 2.

As a result of analysis of a SEM micrograph of the obtained aluminum nitride particles, any characteristic plane unique to the aluminum nitride particle of the present invention was not observed, and it was found that the aluminum nitride particle of the present invention was not obtained. In addition, a cross section of some void having a diameter (equivalent circle diameter) of no less than 5 μm was observed inside the particles.

Comparative Example 4

An aluminum nitride powder was obtained in the same manner as in Example 1 except that the composition of the raw material and the proportion of carbon monoxide gas in the nitrogen gas-containing atmosphere were changed as in Table 1.

Figure 10:
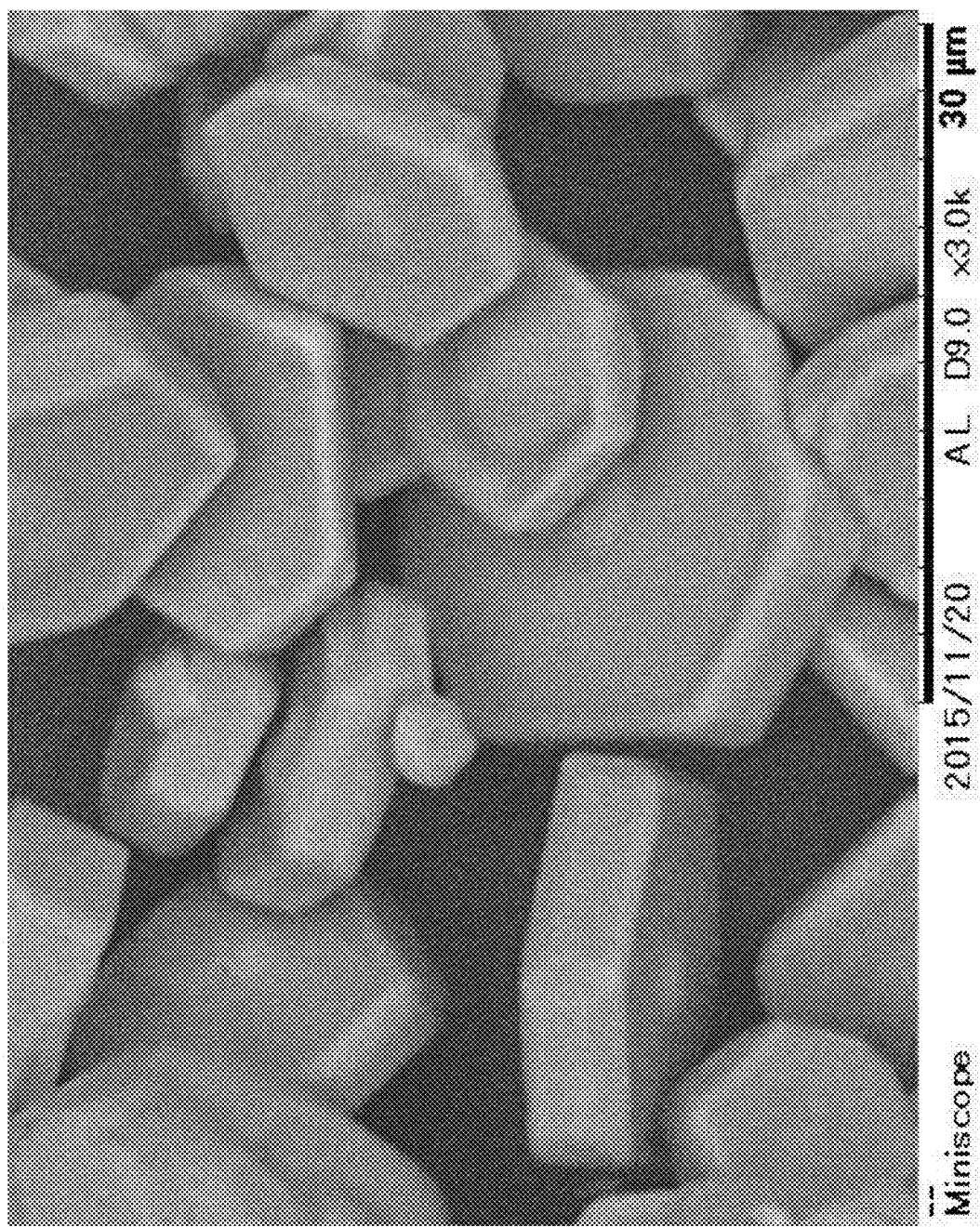
FIG. 10 is a SEM micrograph of aluminum nitride powder particles obtained in Comparative Example 4 (acceleration voltage: 15 kV, secondary electron detection, 3000 times magnification).

FIG. 10 is a SEM micrograph of the obtained aluminum nitride powder (acceleration voltage: 15 k, secondary electron detection, 3000 times magnification). As a result of SEM observation, the obtained aluminum nitride particles had a plate-like hexagonal cylindrical shape having regularity. In addition, the ratio of the longer diameter L and the shorter diameter D, L/D exceeded 1.25, and it was found that the aluminum nitride particle of the present invention was not obtained.

Comparative Example 5

An aluminum nitride powder was obtained in the same manner as in Example 1 except that the composition of the raw material and the proportion of carbon monoxide gas in the nitrogen gas-containing atmosphere were as in Table 1.

Figure 11:
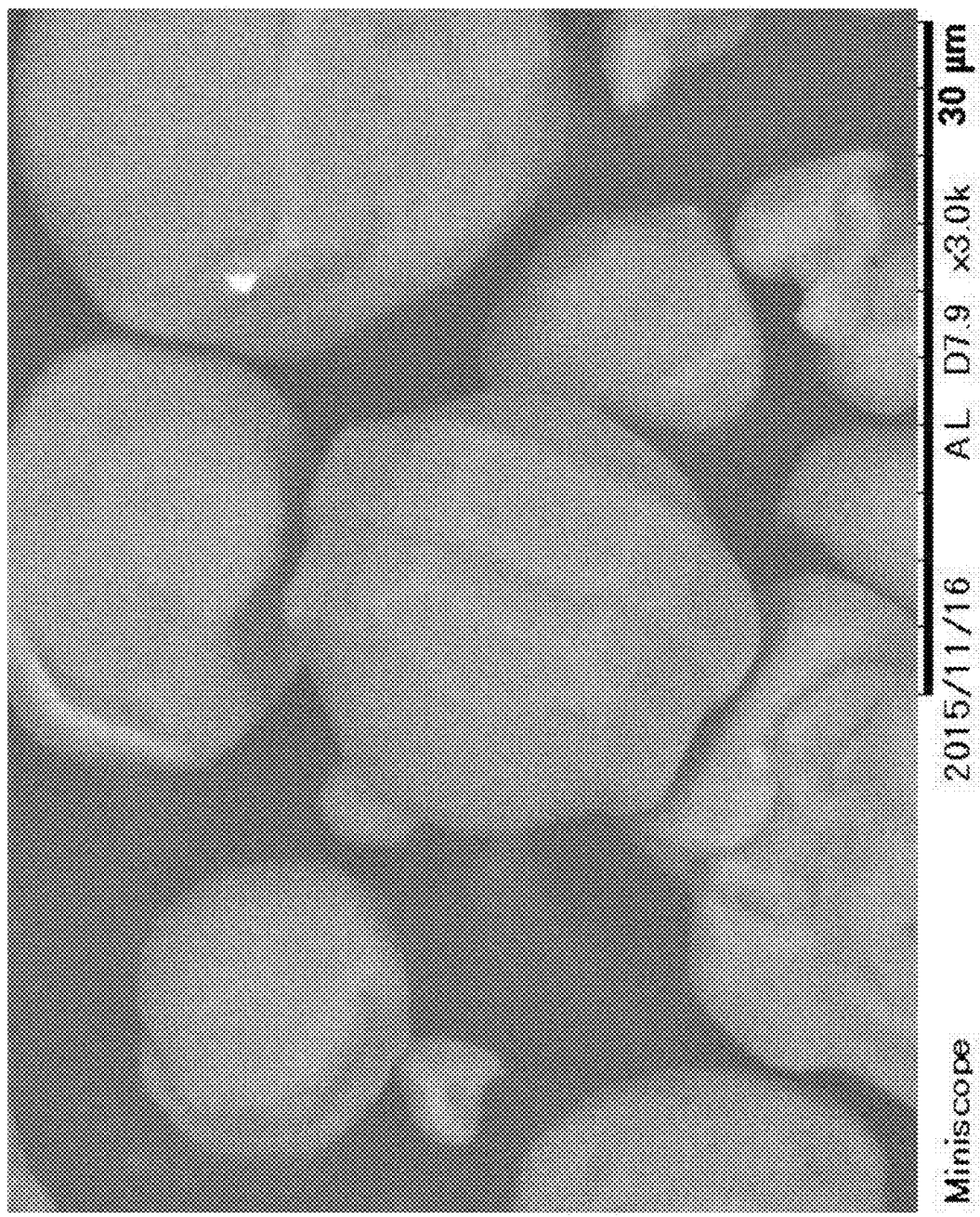
FIG. 11 is a SEM micrograph of aluminum nitride powder particles obtained in Comparative Example 5 (acceleration voltage: 15 k, secondary electron detection, 3000 times magnification).

FIG. 11 is a SEM micrograph of the obtained aluminum nitride powder. As a result of SEM observation, the obtained aluminum nitride particles had a hexagonal cylinder-shaped barrel part having regularity, each end of which had an approximately hemispherical protrusion, and it was found that the aluminum nitride particle of the present invention was not obtained.

TABLE 1

|  |  | Example |  |  |  |  |  |  | Comparative Example |  |  |  |  |
|---|---|---|---|---|---|---|---|---|---|---|---|---|---|
|  |  | 1 | 2 | 3 | 4 | 5 | 6 | 7 | 1 | 2 | 3 | 4 | 5 |
| alumina powder A | parts by weight | 100 | — | — | — | — | — | — | — | 100 | — | 100 | 100 |
| alumina powder B | parts by weight | — | 100 | 100 | 100 | 100 | 100 | 100 | — | — | — | — | — |
| carbon powder A | parts by weight | 50 | — | — | — | — | — | — | — | 42 | — | 50 | 50 |
| carbon powder B | parts by weight | — | 50 | 50 | 80 | 80 | 100 | 100 | — | — | — | — | — |
| sulfur component | parts by weight | 5 | 1 | 5 | 1 | 5 | 1 | 5 | — | — | — | — | 5 |
| yttrium oxide | parts by weight | — | — | — | — | — | — | — | — | 5 | — | — | — |
| CO gas content in nitrogen gas-containing atmosphere | volume % | 53 | 45 | 45 | 50 | 50 | 50 | 50 | — | 10 | — | — | 23 |

TABLE 2

|  |  | Example |  |  |  |  |  |  | Comparative Example |  |  |  |  |
|---|---|---|---|---|---|---|---|---|---|---|---|---|---|
|  |  | 1 | 2 | 3 | 4 | 5 | 6 | 7 | 1 | 2 | 3 | 4 | 5 |
| longer diameter L (μm) | ave | 171 | 28 | 26 | 80 | 83 | 64 | 61 | 83 | 11 | 31 | 15 | 21 |
|  | max | 198 | 34 | 33 | 90 | 91 | 73 | 76 | 92 | 16 | 40 | 28 | 28 |
|  | min | 157 | 20 | 20 | 69 | 72 | 55 | 55 | 20 | 2 | 26 | 6 | 18 |
| L/D | ave | 1.07 | 1.04 | 1.04 | 1.03 | 1.06 | 1.03 | 1.06 | 1.02 | 1.04 | 1.03 | 6.09 | 1.01 |
|  | max | 1.09 | 1.05 | 1.05 | 1.02 | 1.10 | 1.03 | 1.06 | 1.04 | 1.60 | 1.05 | 6.67 | 1.04 |
|  | min | 1.05 | 1.02 | 1.02 | 1.04 | 1.02 | 1.03 | 1.05 | 1.02 | 1.05 | 1.04 | 5.80 | 1.00 |
| regularity of shape/arrangement of plane |  | None | None | None | None | None | None | None | None | None | None | Yes | Yes |
| proportion of plane meeting S/L ≥ 1.0 μm (%) | ave | 85 | 75 | 72 | 80 | 85 | 79 | 77 | 0 | 0 | 0 | 97 | 7 |
|  | max | 90 | 85 | 79 | 89 | 92 | 84 | 87 | 0 | 0 | 0 | 98 | 10 |
|  | min | 79 | 30 | 24 | 73 | 78 | 71 | 74 | 0 | 0 | 0 | 94 | 5 |
| proportion of plane meeting S/L² ≥ 0.05 (%) | ave | 83 | 75 | 68 | 77 | 82 | 76 | 76 | 0 | 0 | 0 | 97 | 7 |
|  | max | 87 | 84 | 77 | 85 | 90 | 81 | 87 | 0 | 0 | 0 | 96 | 9 |
|  | min | 76 | 27 | 22 | 72 | 77 | 68 | 72 | 0 | 0 | 0 | 94 | 5 |
| number of voids having diameter of no less than 5 μm | ave | 0 | 0 | 0 | 0 | 0 | 0 | 0 | 3 | 0 | 2 | 0 | 0 |
|  | max | 0 | 0 | 0 | 0 | 0 | 0 | 0 | 5 | 0 | 4 | 0 | 0 |
|  | min | 0 | 0 | 0 | 0 | 0 | 0 | 0 | 1 | 0 | 1 | 0 | 0 |
| rare earth metal content (mass ppm) |  | <1 | <1 | <1 | <1 | <1 | <1 | <1 | — | 454000 | — | <1 | <1 |
| proportion of AlN particles of present invention (volume %) |  | 72 | 57 | 42 | 70 | 72 | 66 | 70 | 0 | 0 | 0 | 0 | 0 |

<Thermal Conductivity of Resin Composition (1): Epoxy Resin>

A molding of 700 μm in thickness was made using a resin composition comprising the aluminum nitride powder obtained in Example 1 or Comparative Example 1 as a filler, and an epoxy resin.

A mixture of an epoxy resin (jER828 from Mitsubishi Chemical Corporation) (100 parts by weight) and a curing agent (imidazole curing agent, CUREZOL 2E4MZ from SHIKOKU CHEMICALS CORPORATION) (5 parts by weight) was prepared as a base material resin. Next, the base material resin (100 parts by weight), and the aluminum nitride powder obtained in Example 1 or Comparative Example 1 (633 parts by weight) were mixed by means of a mortar, to prepare a resin composition. The filling ratio of the aluminum nitride powder in the resin composition was 70 volume %.

Part of the obtained resin composition was cast into a mold, and set by heat press under the conditions of: 100° C. in temperature; 20 MPa in pressure; and 2 hours in retention time, to make a test piece having a diameter of 10 mm and a thickness of 700 μm. The thermal conductivity of the obtained test piece was measured based on laser flash method by means of a laser flash thermal measurement device (LFA-502 manufactured by Kyoto Electronics Manufacturing Co., Ltd.). As a result, the thermal conductivity of the molding of the resin composition comprising the aluminum nitride powder of Example 1 was 1.5 times as high as that of the molding of the resin composition comprising the aluminum nitride powder of Comparative Example 1.

<Thermal Conductivity in Resin Composition (2): Silicone Resin>

A two-part silicone resin (KE-1013A/B from Shin-Etsu Chemical Co., Ltd.) (100 parts by weight), the aluminum nitride powder obtained in Example 2 or Comparative Example 3 (1293 parts by weight), and globular aluminum nitride having an average particle size of 1 m (from Tokuyama Corporation) (554 parts by weight) were mixed by means of a mortar, to prepare a resin composition. The filling ratio of the aluminum nitride powder in the resin composition was 85 volume %.

Part of the obtained resin composition was cast into a mold, and set by heat press under the conditions of: 120° C. in temperature; 5 MPa in pressure; and 1 hour in retention time, to make a test piece having a diameter of 1 mm and a thickness of 500 μm. The thermal conductivity of the obtained test piece was measured by means of a temperature wave analyzer (ai-Phase Mobile $1u$ manufactured by ai-Phase Co. Ltd.).

As a result of the measurement of thermal conductivity, the thermal conductivity of a molding of the resin composition comprising the aluminum nitride powder of Example 2 was 1.5 times (11 W/m·K) as high as that of a molding of the resin composition comprising the aluminum nitride powder of Comparative Example 3.

<Viscosity of Resin Composition (1)>

A silicone resin (KE-1013A from Shin-Etsu Chemical Co., Ltd.) (100 parts by weight), and the aluminum nitride powder obtained in Example 2 or Comparative Example 3 (605 parts by weight) were mixed to prepare a resin composition, and the viscosity of this resin composition was measured. The filling ratio of the aluminum nitride powder in the resin composition was 65 volume %. A rheometer (AR-2000ex manufactured by TA Instruments) was used for measuring the viscosity under the conditions of: 25° C. in measurement temperature; and $1\ s^{-1}$ in shear rate.

The viscosity of the resin composition comprising the aluminum nitride powder of Comparative Example 3 was 751 Pa·s. In contrast, the viscosity of the resin composition comprising the aluminum nitride powder of Example 2 was 411 Pa·s. A molding made of the resin composition comprising the aluminum nitride powder of Example 2 tended to have higher flexibility compared to a molding made of the resin composition comprising the aluminum nitride powder of Comparative Example 3.

<Viscosity of Resin Composition (2)>

A silicone resin (KE-1013A from Shin-Etsu Chemical Co., Ltd.) (100 parts by weight), and the aluminum nitride powder obtained in Example 2 or Comparative Example 3 (760 parts by weight) were mixed to prepare a resin composition, and the viscosity of this resin composition was measured. The filling ratio of the aluminum nitride powder in the resin composition was 70 volume %. A rheometer (AR-2000ex manufactured by TA Instruments) was used for measuring the viscosity under the conditions of: 25° C. in measurement temperature; and $1\ s^{-1}$ in shear rate.

The viscosity of the resin composition comprising the aluminum nitride powder in Example 2 measured 1020 Pa·s. In contrast, the viscosity of the resin composition comprising the aluminum nitride powder of Comparative Example 3 was too high to be measured by the rheometer.

REFERENCES SIGN LIST

1 raw material mixture
2 second mixture
10 reactor
11 gas inlet
12 gas outlet
21 first boat
22 second boat
31 first heater
32 second heater
40 setter
41 vessel
42 lid
40a first opening
40b second opening

We claim:

1. An aluminum nitride particle comprising:
   a plurality of planes randomly arranged in a surface of the particle, the plurality of planes forming an obtuse ridge part or an obtuse valley part in the surface of the particle, the plurality of planes being observable in a scanning electron micrograph with 500 times magnification,
   wherein the particle has a longer diameter L of 20 to 200 μm;
   a ratio L/D of the longer diameter L (unit: μm) to a shorter diameter D (unit: μm) of the particle is 1 to 1.25; and
   the plurality of planes comprise a first plane, wherein an area S (unit: μm$^2$) of the first plane satisfies S/L≥1.0 μm.

2. The aluminum nitride particle according to claim 1, wherein a content of rare earth metal impurities in the particle is no more than 1 mass ppm in terms of metal.

3. The aluminum nitride particle according to claim 1, wherein the particle does not comprise a void having a diameter of no less than 5 μm.

4. The aluminum nitride particle according to claim 1, wherein the plurality of planes comprise a second plane, wherein an area S (unit: μm$^2$) of the second plane satisfies S/L$^2$≥0.05.

5. An aluminum nitride powder comprising:
the aluminum nitride particle as in claim 1, in an amount of no less than 40 volume %.

6. The aluminum nitride powder according to claim 5, wherein a content of rare earth metal impurities is no more than 1 mass ppm in terms of metal on the basis of the total mass of the aluminum nitride powder.

7. A filler for a resin, the filler consisting of the aluminum nitride powder as in claim 5.

8. A resin composition comprising:
the filler for a resin as in claim 7; and
a resin,
wherein a content $W_{particle}$ of the aluminum nitride particle in the resin composition is 300 to 1000 parts by weight per 100 parts by weight of the resin; and
the content $W_{particle}$ (unit: parts by weight) of the aluminum nitride particle is calculated by the following formula (2):

$$W_{particle} = W_{powder} \times \frac{R_V}{100} \quad (2)$$

wherein $W_{powder}$ (unit: parts by weight) is a content of the aluminum nitride powder in the resin composition; and Rv (unit: volume %) is a content of the aluminum nitride particle in the aluminum nitride powder.

9. A method for producing the aluminum nitride powder of claim 5, the method comprising:
(i) carrying out reduction nitridation of an alumina powder, the (i) comprising heating a raw material mixture in a nitrogen gas-containing atmosphere, the raw material mixture comprising the alumina powder, a carbon powder, and a sulfur component; and
(ii) after completion of the reduction nitridation, keeping, for no less than 1 hour, a product of the reduction nitridation at a temperature within ±30° C. of a heating temperature at a time the reduction nitridation is completed in an atmosphere such that an aluminum nitride powder formed in the (i) is not oxidized,
the (i) comprising:
(i-a) carrying out the reduction nitridation in the nitrogen gas-containing atmosphere being a mixed gas of 55 to 30 volume % of nitrogen gas and 45 to 70 volume % of a diluting gas, at least while a nitridation ratio is 5 to 50%.

10. The method according to claim 9,
wherein a content of the sulfur component in the raw material mixture is 1.0 to 20 parts by weight in terms of sulfur per 100 parts by weight of the alumina powder in the raw material mixture.

11. A method for producing the aluminum nitride powder of claim 5, the method comprising:
(i) carrying out reduction nitridation of an alumina powder, the (i) comprising heating a raw material mixture in a nitrogen gas-containing atmosphere, the raw material mixture comprising the alumina powder, a carbon powder, and a sulfur component; and
(ii) after completion of the reduction nitridation, keeping, for no less than 1 hour, a product of the reduction nitridation at a temperature within ±30° C. of a heating temperature at a time the reduction nitridation is completed in an atmosphere such that an aluminum nitride powder formed in the (i) is not oxidized,
the (i) comprising:
(i-b1) placing the raw material mixture in a setter and placing the setter in a reactor, the setter comprising:
a boat-shaped vessel, a top of the vessel being open;
a lid closing the top of the vessel;
a first opening arranged on an upstream side in a gas flow direction in the reactor such that a gas can be introduced into the setter; and
a second opening arranged on a downstream side in the gas flow direction in the reactor such that a gas can flow out of the setter;
(i-b2) supplying nitrogen gas or a mixed gas comprising nitrogen gas and a diluting gas into the reactor;
(i-b3) making part of a gas supplied into the reactor flow into the setter through the first opening;
(i-b4) forming the nitrogen gas-containing atmosphere in the setter, from a gas flowing into the setter from the first opening and carbon monoxide gas generated by the reduction nitridation; and
(i-b5) carrying out the reduction nitridation in the nitrogen gas-containing atmosphere in the setter, while maintaining conditions such that an average nitrogen gas content $p^{avr}_{N2}$ in the nitrogen gas-containing atmosphere in the setter calculated by the following formula (3) becomes 55 to 30 volume % and such that an average diluting gas content $p^{avr}_{dilute}$ in the nitrogen gas-containing atmosphere in the setter calculated by the following formula (4) becomes 45 to 70 volume %, at least while a nitridation ratio is 5 to 50%:

$$p^{avr}_{N2} = \frac{1}{2}\left(p^{in}_{N2} + 100 \times \frac{\frac{p^{in}_{N2}}{100} \cdot \frac{S_{open}}{S_{open}+S_{bypass}} V^{in} - \frac{1}{3}V^{f}_{CO}}{\frac{S_{open}}{S_{open}+S_{bypass}} V^{in} + \frac{2}{3}V^{f}_{CO}}\right) \quad (3)$$

$$p^{avr}_{dilute} = \frac{1}{2}\left(p^{in}_{dilute} + 100 \times \frac{\frac{p^{in}_{dilute}}{100} \cdot \frac{S_{open}}{S_{open}+S_{bypass}} V^{in} + V^{f}_{CO}}{\frac{S_{open}}{S_{open}+S_{bypass}} V^{in} + \frac{2}{3}V^{f}_{CO}}\right) \quad (4)$$

wherein $p^{in}_{N2}$ (unit: volume %) is a nitrogen gas content of the gas flowing into the setter; $p^{in}_{dilute}$ (unit: volume %) is a diluting gas content of the gas flowing into the setter; $V^{in}$ (unit: m³/s) is a gas inflow into the reactor; $S_{open}$ (unit: m²) is a minimum value of a cross section of a gas flow path formed by the first opening of the setter; $S_{bypass}$ (unit: m²) is a minimum value of a cross section of a gas flow path bypassing the setter; and $V^{f}_{CO}$ (unit: m³/s) is a rate of generation of carbon monoxide gas in the setter.

12. The method according to claim 11,
wherein the content of the sulfur component in the raw material mixture is 1.0 to 20 parts by weight in terms of sulfur per 100 parts by weight of the alumina powder in the raw material mixture.

* * * * *